US012425647B2

(12) United States Patent
Joshi et al.

(10) Patent No.: US 12,425,647 B2
(45) Date of Patent: *Sep. 23, 2025

(54) TILING FOR VIDEO BASED POINT CLOUD COMPRESSION

(71) Applicant: Samsung Electronics Co., Ltd., Suwon-si (KR)

(72) Inventors: Rajan Laxman Joshi, San Diego, CA (US); Madhukar Budagavi, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 184 days.

This patent is subject to a terminal disclaimer.

(21) Appl. No.: 18/325,969

(22) Filed: May 30, 2023

(65) Prior Publication Data

US 2023/0308684 A1 Sep. 28, 2023

Related U.S. Application Data

(63) Continuation of application No. 17/354,997, filed on Jun. 22, 2021, now Pat. No. 11,695,957.

(Continued)

(51) Int. Cl.
*H04N 19/597* (2014.01)
*H04N 19/172* (2014.01)
(Continued)

(52) U.S. Cl.
CPC ......... *H04N 19/597* (2014.11); *H04N 19/172* (2014.11); *H04N 19/174* (2014.11); *H04N 19/55* (2014.11); *H04N 19/70* (2014.11)

(58) Field of Classification Search
CPC .. H04N 19/597; H04N 19/172; H04N 19/174; H04N 19/55; H04N 19/70
See application file for complete search history.

(56) References Cited

U.S. PATENT DOCUMENTS

2019/0087979 A1 3/2019 Mammou
2019/0373278 A1 12/2019 Castaneda
(Continued)

FOREIGN PATENT DOCUMENTS

CN 102693319 A 9/2012
EP 3474562 A1 4/2019
WO 2019243663 A1 12/2019

OTHER PUBLICATIONS

Jang, Euee S., et al. "Video-based point-cloud-compression standard in MPEG: From evidence collection to committee draft [standards in a nutshell]." IEEE Signal Processing Magazine 36.3: 118-123. (Year: 2019).*

(Continued)

*Primary Examiner* — Fabio S Lima

(57) ABSTRACT

A method for point cloud encoding includes generating, for a three-dimensional (3D) point cloud, video frames and atlas frames that includes pixels representing information about the 3D point cloud, wherein atlas tiles represent partitions in the atlas frames and video tiles represent partitions in the video frames. The method also includes setting a value for a syntax element according to relationships between sizes of the video tiles and sizes of the atlas tiles. The method further includes encoding the video frames and the atlas frames to generate video sub-bitstreams and an atlas sub-bitstream, respectively. Additionally, the method includes generating a bitstream based on the atlas sub-bitstream, the video sub-bitstreams, and the syntax element and transmitting the bitstream.

20 Claims, 14 Drawing Sheets

Related U.S. Application Data

(60) Provisional application No. 63/045,500, filed on Jun. 29, 2020, provisional application No. 63/044,471, filed on Jun. 26, 2020, provisional application No. 63/043,391, filed on Jun. 24, 2020.

(51) Int. Cl.
    *H04N 19/174*     (2014.01)
    *H04N 19/55*     (2014.01)
    *H04N 19/70*     (2014.01)

(56) References Cited

U.S. PATENT DOCUMENTS

| | | |
|---|---|---|
| 2020/0229178 A1 | 7/2020 | Gao |
| 2021/0099687 A1* | 4/2021 | Shin ........................ H04N 19/37 |
| 2022/0094909 A1* | 3/2022 | Hannuksela ......... H04N 19/167 |

OTHER PUBLICATIONS

Extended European Search Report issued May 16, 2024 regarding Application No. 21829616.8, 8 pages.
Joshi et al., "[V-PCC] VUI signalling for constrained tile sizes", ISO/IEC JTC1/SC29/WG11 MPEG2020/m54689-v3 (XP030289257), Jun. 2020, 7 pages.
"Information technology—Coded Representation of Immersive Media—Part 5: Visual Volumetric Video-based Coding (V3C) and Video-based Point Cloud Compression (V-PCC)", ISO /IEC 23090-5:2019(E), ISO/IEC JTC 1/SC 29/WG 11 (XP030285587), May 2020, 246 pages.
Ilola et al., "[PCC Systems] Comments on Partial Access in Carriage of Video-based Point Cloud Compression Data Part 2", ISO/IEC JTC1/SC29/WG 11 MPEG2020/m53121 (XP03028646), Apr. 2020, 11 pages.
International Search Report and Written Opinion of the International Searching Authority dated Sep. 28, 2021, in connection with International Application No. PCT/KR2021/007955, 9. pages.
"Information technology-Coded Representation of Immersive Media—Part 5: Visual Volumetric Video-based Coding (V3C) and Video-based Point Cloud Compression (V-PCC)", ISO/IEC JTC 1/SC 29/WG 11, ISO/IEC 2020, Secretariat: JISC, 351 pages.

* cited by examiner

TILING FOR VIDEO BASED POINT CLOUD COMPRESSION

CROSS-REFERENCE TO RELATED APPLICATION AND CLAIM OF PRIORITY

This application is a continuation of U.S. patent application Ser. No. 17/354,997, filed Jun. 22, 2021, which claims priority under 35 U.S.C. § 119(e) to U.S. Provisional Patent Application No. 63/043,391 filed on Jun. 24, 2020, U.S. Provisional Patent Application No. 63/044,471 filed on Jun. 26, 2020, and U.S. Provisional Patent Application No. 63/045,500 filed on Jun. 29, 2020. The above-identified provisional patent applications are hereby incorporated by reference in its entirety.

TECHNICAL FIELD

This disclosure relates generally to multimedia data. More specifically, this disclosure relates to apparatus and a method for compressing and decompressing point clouds.

BACKGROUND

Three hundred sixty degree (360°) video is emerging as a new way of experiencing immersive video due to the ready availability of powerful handheld devices such as smartphones. 360° video enables immersive "real life," "being there" experience for consumers by capturing the 360° view of the world. Users can interactively change their viewpoint and dynamically view any part of the captured scene or object they desire. Display and navigation sensors can track head movement of the user in real-time to determine the region of the 360° video that the user wants to view. Multimedia data that is three-dimensional (3D) in nature, such as point clouds, can be used in the immersive environment.

Point clouds are a set of points in 3D space that represent an object. Point clouds are common in a variety of applications such as gaming, 3D maps, visualizations, medical applications, augmented reality, virtual reality, autonomous driving, multi-view replay, 6 degrees of freedom (6 DoF) immersive media, to name a few. Point clouds, if uncompressed, generally require a large amount of bandwidth for transmission. Due to the large bitrate requirement, point clouds are often compressed prior to transmission. Compressing a 3D object such as a point cloud often requires specialized hardware. To avoid specialized hardware to compress a 3D point cloud, a 3D point cloud can be manipulated onto traditional two-dimensional (2D) video frames that can be compressed and reconstructed on a different device in order to be viewed by a user.

SUMMARY

This disclosure provides an indication of tiling for video based point cloud compression.

In one embodiment, an encoding device for point cloud encoding is provided. The encoding device includes a processor and a communication interface. The processor is configured to generate, for a three-dimensional (3D) point cloud, video frames and atlas frames that include pixels representing information about the 3D point cloud. Atlas tiles represent partitions in the atlas frames and video tiles represent partitions in the video frames. The processor is configured to set a value for a syntax element according to relationships between sizes of the video tiles and sizes of the atlas tiles. The processor is configured to encode the video frames and the atlas frames to generate video sub-bitstreams and an atlas sub-bitstream, respectively. The processor is configured to generate a bitstream based on the atlas sub-bitstream, the video sub-bitstreams, and the syntax element. The communication interface is configured to transmit the bitstream.

In another embodiment, a method for point cloud encoding is provided. The method includes generating, for a three-dimensional (3D) point cloud, video frames and atlas frames that include pixels representing information about the 3D point cloud. Atlas tiles represent partitions in the atlas frames and video tiles represent partitions in the video frames. The method further includes setting a value for a syntax element according to relationships between sizes of the video tiles and sizes of the atlas tiles. Additionally, the method also includes encoding the video frames and the atlas frames to generate video sub-bitstreams and an atlas sub-bitstream, respectively. The method also includes generating a bitstream based on the atlas sub-bitstream, the video sub-bitstreams, and the syntax element and transmitting the bitstream.

In yet another embodiment a decoding device for point cloud decoding is provided. The decoding device includes a processor and a communication interface. The communication interface configured to receive a bitstream. The processor is configured to identify, from the bitstream, one or more video sub-bitstreams representing a three-dimensional (3D) point cloud, atlas sub-bitstream, and a syntax element with a value, wherein atlas tiles are included in the atlas sub-bitstream and video tiles are included in the video sub-bitstreams. The processor is configured to identify from the value of the syntax element relationships between sizes of the video tiles in the one or more video sub-bitstreams and sizes of the atlas tiles in the atlas sub-bitstream. The processor is configured to decode a portion of the video sub-bitstreams and a portion of the atlas sub-bitstream, based on the video tiles and the atlas tiles, to generate a portion of video frames and a portion of atlas frames. The processor is configured to reconstruct a portion of the point cloud based on the portion of the video frames and the portion of the atlas frames.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
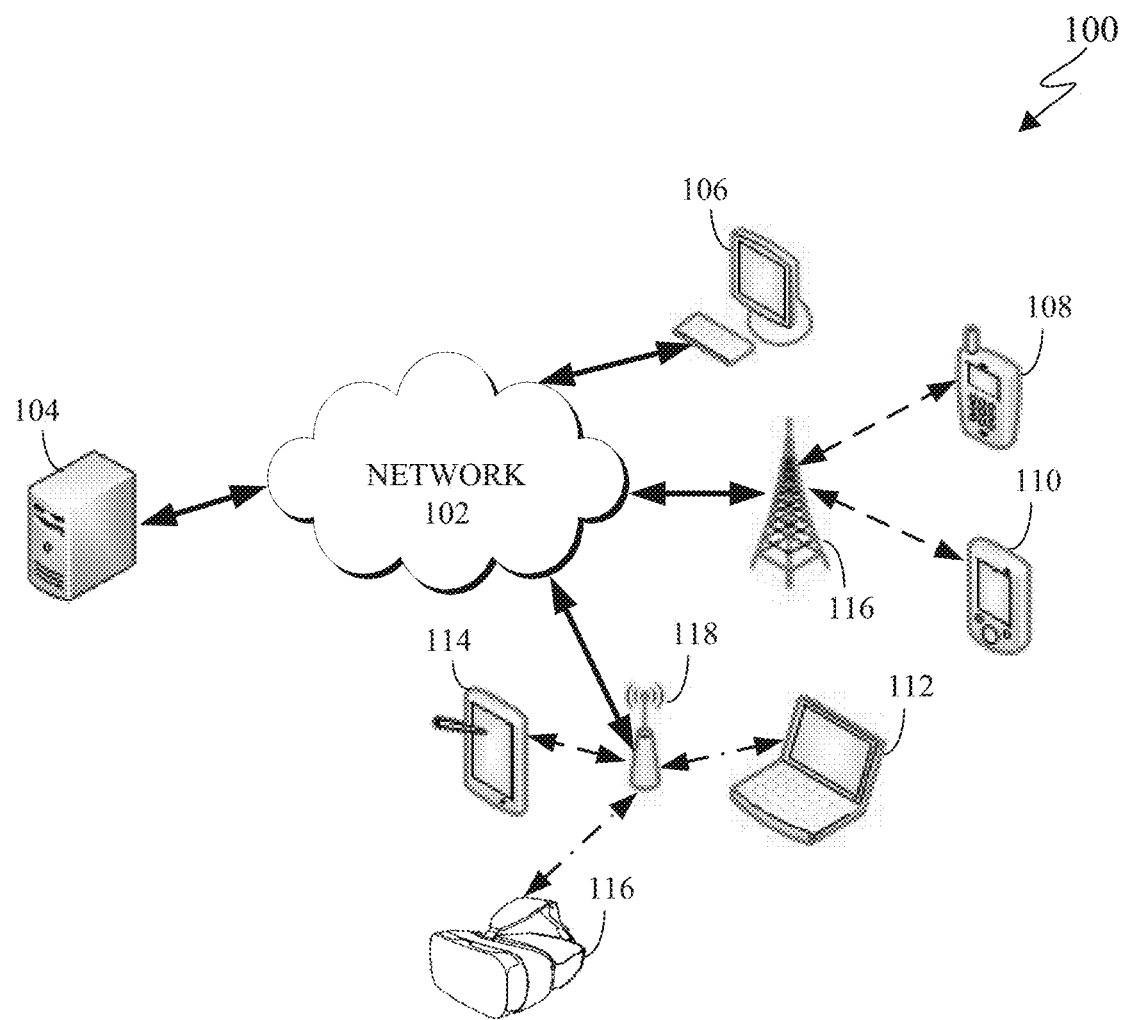
FIG. 1 illustrates an example communication system in accordance with an embodiment of this disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Visual volumetric video based coding (V3C) is a mechanism for encoding and decoding visual volumetric data. V3C converts media from a 3D representation to multiple 2D representations. Video based point cloud compression (V-PCC) is based on V3C, but includes additional processes such as post decoding, pre-reconstruction, post-reconstruction, and adaptation.

Virtual reality (VR) is a rendered version of a visual scene, where the entire scene is computer generated. Augmented reality (AR) is an interactive experience of a real-world environment where objects that reside in the real-world environment are augmented with virtual objects, virtual information, or both. In certain embodiments, AR and VR include both visual and audio experiences. A visual rendering is designed to mimic the visual stimuli, and if available audio sensory stimuli, of the real world as naturally as possible to an observer or user as the user moves within the limits defined by the application or the AR or VR scene. For example, VR places a user into immersive worlds that respond to detected head movements of a user. At the video level, VR is achieved by providing a video experience that covers as much of the field of view (FOV) as possible together with the synchronization of the viewing angle of the rendered video with the head movements.

Many different types of devices are able to provide the immersive experience associated with AR or VR. One example device is a head-mounted display (HMD). An HMD represents one of many types of devices that provide AR and VR experiences to a user. An HMD is a device that enables a user to view the VR scene and adjust the displayed content based on movements of the head of the user. Typically, an HMD relies either on a dedicated screen that is integrated into a device and connected with an external computer (tethered) or on a device, such as a smartphone, that is inserted into the HMD (untethered). The first approach utilizes one or more lightweight screens and benefits from a high computing capacity. In contrast, the smartphone-based systems utilize higher mobility and can be less expensive to produce. In both instances, the video experience generated is the same. It is noted that as used herein, the term "user" may denote a human or another device (such as an artificial intelligent electronic device) using the electronic device.

A point cloud is a virtual representation of an object in three dimensions. For example, a point cloud is a collection of points in 3D space, and each point is positioned at a particular geometric location within 3D space. In addition to a point having a geometric location, the points can include zero or more attributes (such as color, texture, reflectance, intensity, normal, material properties, motion, and the like). A point cloud can be similar to a virtual object in a VR or AR environment. A mesh is another type of a virtual representation of an object in a VR or AR environment. A point cloud or a mesh can be an object, multiple objects, a virtual scene (which includes multiple objects), and the like. As described above, point clouds and meshes are commonly used in a variety of applications, including gaming, 3D mapping, visualization, medicine, AR, VR, autonomous driving, multi-view replay, 6 DoF immersive media, to name a few. As used herein, the terms point cloud, 3D point cloud, 3D mesh, and mesh are used interchangeably.

Point clouds represent volumetric visual data. Point clouds consist of multiple points positioned in 3D space, where each point in a 3D point cloud includes a geometric position represented by 3-tuple (X, Y, Z) coordinate values. When each point is identified by the three coordinates, a precise location in 3D environment or space is identified. The location in a 3D environment or space of each point can be relative to an origin, other points of the point cloud, or a combination thereof. The origin is a location where the X, Y, and Z axis intersect. In certain embodiments, the points are positioned on the external surface of the object. In other embodiments, the points are positioned throughout both the internal structure and external surface of the object.

In addition to the geometric position of a point (the location of the point in 3D space), each point in the point cloud can also include zero or more attributes such as color, texture, reflectance, intensity, surface normal, and the like. In some embodiments, a single point of a 3D point cloud can have no attributes. In other embodiments, a single point of a 3D point cloud can have one or more attributes. In some applications, point clouds can also be used to approximate light field data in which, each point includes multiple view-dependent, color information (R, G, B or Y, U, V triplets).

A single point cloud can include billions of points, with each point associated with a geometric position and zero or more attributes. A geometric position and each additional attribute that is associated with a point occupy a certain number of bits. For example, a geometric position of a single point in a point cloud can consume thirty bits. For instance, if each geometric position of a single point is defined with an X value, a Y value, and a Z value, then each coordinate (the X, the Y, and the Z) uses ten bits, totaling the thirty bits. Similarly, an attribute that specifies the color of a single point can consume twenty-four bits. For instance, if a color component of a single point is defined based on a Red value, Green value, and Blue value, then each color component (Red, Green, and Blue) uses eight bits, totaling the twenty-four bits. As a result, a single point with a ten-bit geometric data, per coordinate, and an eight-bit color attribute data, per color value, occupies fifty-four bits. Each additional attribute increases the bits required for a single point. If a frame includes one million points (and each point includes geometric data and color attribute data), the number of bits per frame is fifty-four million bits (fifty-four bits per point times one million points per frame). If the frame rate is thirty frames per second and undergoes no compression, then 1.62 gigabytes per second (fifty-four million bits per frame times thirty frames per second) are to be transmitted from one electronic device to another in order for the second device to render and display the point cloud. Therefore, transmitting an uncompressed point cloud from one electronic device to another uses significant bandwidth due to the size and complexity of the data associated with a single point cloud. As a result, the point cloud is compressed prior to the transmission.

Embodiments of the present disclosure take into consideration that compressing a point cloud is necessary to reduce the volume of data (bandwidth) that is used when a point cloud is transmitted from one device (such as a source device) to another device (such as a display device or user device). Certain dedicated hardware components can be used to meet the real-time demands or reduce delays or lags in the transmitting and rendering a 3D point cloud; however, such hardware components are often expensive. Additionally, many video codecs are not able to encode and decode 3D video content, such as a point cloud. Compressing and decompressing a 3D point cloud by leveraging existing 2D video codecs enables the encoding and decoding of a point cloud to be widely available without the need for new or specialized hardware. According to embodiments of the present disclosure, when the point cloud is converted from a 3D representation to a 2D representation existing video codecs can be used to compress and reconstruct a point cloud.

Embodiments of the present disclosure provide systems and methods for converting an input 3D point cloud into a 2D representation that can be transmitted and then reconstructed into the 3D point cloud for rendering. An encoder converts an input 3D a point cloud onto multiple 2D frames (such as geometry frames, attribute frames, and occupancy map frames). The 2D frames can represent video frames. The 2D video frames can be encoded (using video codecs such as HEVC, AVC, VP9, VP8, VVC, and the like) to compress the 2D frames for transmission via a bitstream. A decoder receives and decodes the bitstream and then reconstructs the 3D point cloud from the 2D frames such that the 3D point cloud can be rendered, displayed, and then viewed by a user. Embodiments of the present disclosure describe systems and methods for enabling partial decoding of the received bitstream representing a point cloud. Accordingly, a decoder need only decode and render a portion of the received bitstream representing a portion of the point cloud, instead of decoding the entirety of the point cloud.

To convert an input 3D point cloud to a 2D representation that can be transmitted using 2D video frames, the point cloud is deconstructed from a 3D state into multiple patches which are packed into the 2D video frames. Points of the 3D point cloud that are represented in one patch in a first frame correspond to the same points that are represented in another patch in a second frame when the two patches are positioned at over the same coordinates. For example, a pixel at the position (u, v) in a frame that represents geometry is the geometry position of a pixel at the same (u, v) position in a frame that represents an attribute such as color. In other embodiments, the patches in one frame represent multiple attributes associated with the points of the point cloud, such as a geometric position of the points in 3D space and color.

To deconstruct a 3D point cloud for transmission from one device to another, the geometric positions of the points of the point cloud are separated from the attribute information of the points. Projections of the 3D point cloud are made with respect to different projection planes, such that the 3D point cloud is separated into multiple clusters of points which are represented as patches on 2D video frames. A first set of frames can include values representing geometry positions of the points. Each additional set of frames can represent different attributes of the point cloud. For example, one attribute frame can include values representing color information associated with each of the points. The patches representing the geometry and attribute information (if present) are packed into geometry video frames and attribute video frames, respectively, where each pixel within any of the patches corresponds to a point in 3D space. The geometry video frames are used to encode the geometry information, and each of the corresponding attribute video frames (if present) are used to encode a corresponding attribute (such as color) of the 3D point cloud.

Figure 4A:
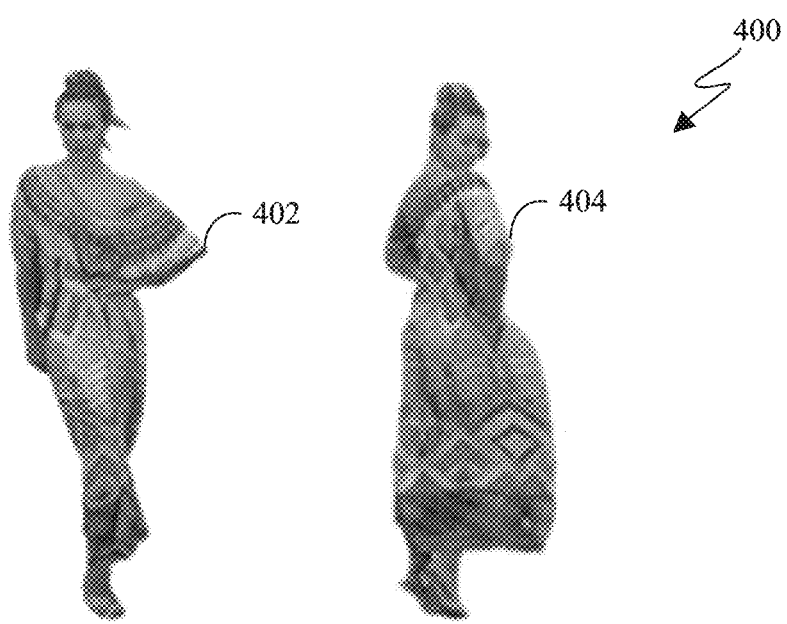
FIG. 4A illustrates an example 3D point cloud in accordance with an embodiment of this disclosure.
Figure 4B:
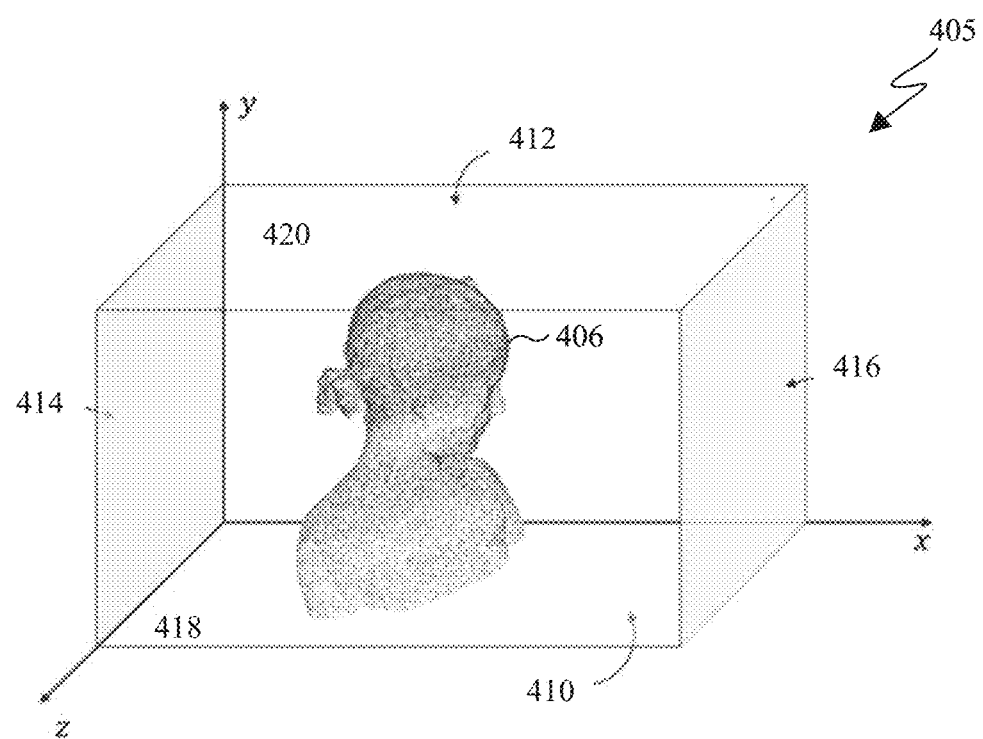
FIG. 4B illustrates a diagram of a point cloud that is surrounded by multiple projection planes in accordance with an embodiment of this disclosure.
Figure 4C:
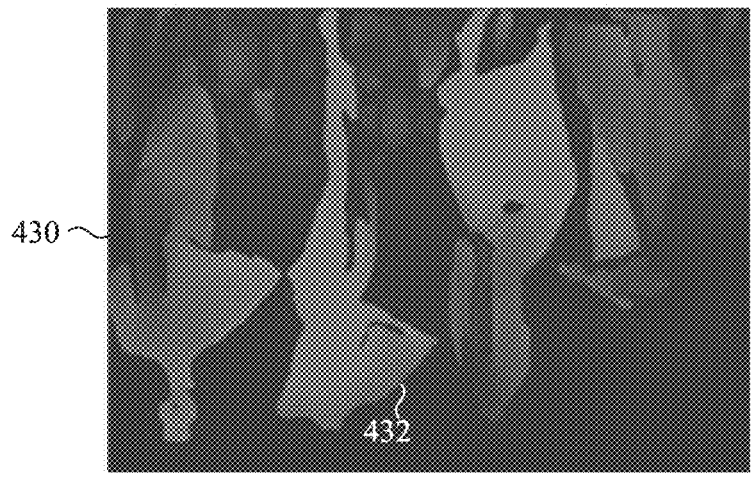
FIGS. 4C and 4D illustrate example 2D frames that include patches representing the 3D point cloud of FIG. 4A in accordance with an embodiment of this disclosure.
Figure 4D:
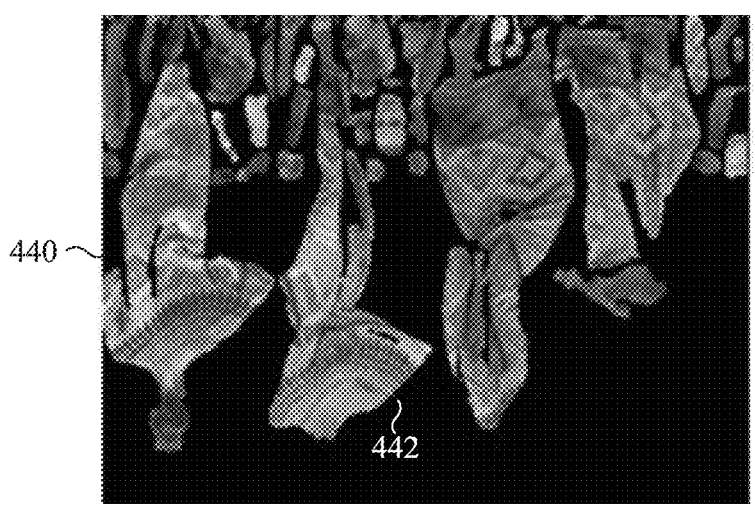

When the point cloud is deconstructed to fit on multiple 2D video frames and compressed, by an encoder, the frames can be transmitted using less bandwidth than used to transmit the original point cloud. FIGS. 4A-4D, which are described in greater detail below, illustrate various stages of projecting a point cloud onto different plans and thereafter storing the projections into 2D frames. For example, FIG. 4A, illustrates two views of a 3D point cloud, illustrating that a point cloud can be a 360° view of an object. FIG. 4B illustrates the process of projecting a 3D point cloud onto different planes. After the point cloud (such as the point cloud of FIG. 4A) is projected onto different planes, FIGS. 4C and 4D illustrate a geometry frame and an attribute frame (which represents the color of the points of the 3D point cloud), respectively, which include patches corresponding to the various projections.

An encoder can distinguish between geometry and attributes associated with the points of a point cloud. The geometry and attributes of a point cloud are clustered (using some criteria such as normal direction, distance to projected frames, contiguity, and the like) and are projected onto different planes (e.g. XY, YZ, ZX plane). Furthermore, for each projection plane, the points may be projected to a near plane or a far plane. FIG. 4B, discussed in greater detail below, describes the projection planes. Each of the clusters shows up as a patch when projected on a plane. The patches are sorted and packed into 2D video frame(s) storing the geometry. In certain embodiments, there may be zero or more attribute frames associated with each geometry frame. The 2D plane in which the patches are packed is referred to as a canvas. In certain embodiments, there could be multiple points being projected to the same pixel on the canvas, as such, two (or more) maps may be considered for patch projection. In case of multiple maps, for each map, a geometry video is formed. Similarly, for each map and each attribute, an attribute video is formed. Each video is then encoded with a video codec such as HEVC, AVC, VP9, VP8, JVET, AVC or the like.

The geometry video frames are used to encode the geometry coordinates of the points of the 3D point cloud. A location (u, v) of a pixel in the geometry frame corresponds to a (X, Y, Z) location of a point in 3D space. For example, the two transverse coordinates (with respect to the projection plane) of a 3D point corresponds to the column and row indices in the geometry video frame (u, v) plus a transverse-offset which determines the location of the entire patch within the video frame. The depth of the 3D point is encoded as the value of the pixel in the video frame plus a depth-offset for the patch. The depth of the 3D point cloud depends on whether the projection of the 3D point cloud is taken from the XY, YZ, or XZ coordinates.

The encoder can also generate an occupancy map (also referred to an occupancy map frame). The occupancy map shows the location of projected points in the 2D videos frames. For each canvas, there is a single occupancy map that is shared by all the maps. For each pixel on the canvas, the occupancy map specifies whether that pixel is occupied, that is, whether it is part of a patch. The occupancy map shows the location of projected points in the 2D videos frames. For example, since the patches may not occupy the entirety of the generated frames, the occupancy map indicates which pixels of the geometry frame and attribute frame correspond to a point of the point cloud and which pixels are empty/invalid and do not correspond to a point of the point cloud (such as a pixel that represents padding). In certain embodiments, the occupancy map frame is compressed.

After generating the geometry frames and the occupancy map frames, the frames can be compressed by leveraging various video compression codecs, image compression codecs, or both. For example, the encoder first generates and then compresses the geometry frames using a 2D video codec such as HEVC. In certain embodiments, the encoder also encodes the occupancy map frames. In certain embodiments, the encoder can smooth the geometry of the reconstructed point cloud. It is noted that based on whether the encoder smooths the geometry of the reconstructed point cloud affects how the decoder reconstructs the 3D point cloud.

To generate an attribute frame (such as the color of the 3D point cloud), in some embodiments, the encoder decodes the encoded geometry frame (and the occupancy map frames if they were encoded) and reconstructs the 3D coordinates of the 3D point cloud. The encoder may interpolate the color values of each point from the color values of original point cloud to the corresponding geometry points of the smoothed geometry or the reconstructed geometry. The interpolated color values are then packed into a color frame which is compressed. Accordingly, the geometry video frames are used to encode the geometry information, and the corresponding attribute video frames are used to encode the attribute (such as color) of the point cloud.

For example, after the geometry frames and occupancy maps are formed, they are coded using a video codec such as HEVC. The geometry frames (and occupancy map videos if they were previously encoded) are decompressed. The encoder then reconstructs the geometry of the 3D point cloud using the decoded geometry frames and the occupancy map video frames. The attribute video frames are generated using the occupancy map frames, the input point cloud, and patch information and the reconstructed geometry of the 3D point cloud.

The encoder can also generate atlas frame(s) (also referred to as an atlas sequence). The atlas frame includes information about the patches in the frames (such as the geometry video frames, the attribute video frames, the occupancy map frames, and the like). The atlas frame can include the positioning of the patches within the 2D frame, the offsets for the patch segment in the 3D point cloud space, the plane on which the patch is projected on, and the like. The atlas frame can include information about the position and size of patches and their orientation in atlas frames, the position and size of the patches in the 3D space as well as certain other properties of the patches.

In certain embodiments, the atlas frame includes 3D information and 2D information. Regarding the 3D information, the atlas frame can specify the 3D locations of a patch, such as the location of a patch in 3D space. The atlas frame can also specify the 3D offset of a patch. Regarding the 2D information, the atlas frame can specify where the patches are located on a grid of a 2D frame, as well as the size of the patch. The atlas frame can also specify additional information related to the patches such as information about the type of patch.

In certain embodiments, the video frames (such as the geometry video frames, the attribute video frames, the occupancy map frames, and the like) and the atlas frames are partitioned into tiles. For example, each of the video frames can be partitioned into one or more tiles. Similarly, the atlas frames can be partitioned into one or more tiles. For example, if there are 100 patches and the encoder determines to use four tiles, then the patches are divided between the four tiles. The patches can be, but are not required to be, equally divided between the four tiles. For instance, tile 0 can include 10 patches, tile 1 can include 40 patches, tile 2 can include 30 patches, and tile 3 can include 20 patches.

In certain embodiments, there is a relationship between the tiles of the video frames and the tiles of the atlas frame(s). For example, a tile of one of the video frames corresponds to similar location as a tile in the atlas frame. Even if the video frames and the atlas frames are different sizes, the relative position of the tile in the video frames is similar to the relative position of the tile in the atlas frame. The size of a tile in the video frames can also be proportional to the size of a tile in the atlas frame. For example, if a video frame is downsized in both the X and Y coordinates, the size of the tiles in the video frame would be the same size as the tiles in the atlas frame if the video frame is scaled to a nominal size. In this example, if the atlas frame is 1024×1024 with tiles that are 256×256, and the geometry frame is 512×512 with tiles that are 128×128, if the geometry frame was scaled to be the same size as the atlas frame, then the tiles of the geometry frame would be a similar size (that of 256×256) as the tiles in the atlas frame. A value of a syntax element or message can specify the relationship between tiles of a video frame and tiles of an atlas frame.

Motion can be constrained in the tiles when the frames are compressed. That is, a group of tiles can be encoded and decoded independently without having to depend on data from other tiles. For example, HEVC encoding uses a previous frame as a predictor for encoding a current frame. However, when using tiling, HEVC can constrain the motion to within a particular tile. If motion is constrained within tiles, a motion vector is not directed outside of the tile or group of tiles. By using motion constrained tiles, a decoder can decode individual tiles without referring to data from other tiles. This enables a decoder to decode only certain portions of a frame, such as one or more tiles, without having to decode the entire frame. By enabling a decoder to decode one or more portions of a frame, can save processing power. It is noted that if the encoder determines to use motion contained tiles, then the decoder has the ability to decode only certain tiles. However, if the encoder does not use motion constrained tiles, then the decoder needs to decode the entire frame.

In certain embodiments, a message or syntax element can be included in the bitstream for indicating the relationship between tiles of the video frames (such as the geometry video frames, the attribute video frames, the occupancy map frames, and the like) and the tiles of the atlas frame. The syntax element enables the decoder, if the decoder determines to perform partial decoding, to determine the relationships between tiles in the atlas frames and tiles in a video frame.

The compressed geometry frames, the compressed color frames (and any other attribute frame), and the occupancy map frame can be multiplexed to generate a bitstream. The encoder or another device then transmits the bitstream that includes the 2D frames to a different device. It is noted that the terms "bitstream," "sub-bitstream," and "substream" may be used interchangeably in the disclosure.

A decoder receives the bitstream, decompresses the bitstream into the frames, and reconstructs the point cloud based on the information within the frames. After the point cloud is reconstructed, the 3D point cloud can be smoothed to improve the visual quality of the 3D point cloud. Thereafter the reconstructed 3D point can be rendered and displayed for a user to observe.

Embodiments of the present disclosure takes into consideration that a decoder may not want to decode an entire point cloud. For example, if a decoder is battery powered, the decoder could extend its battery life when the decoder only decodes content that is to be rendered instead of decoding an entire frame.

Therefore, embodiments of the present disclosure provide systems and methods to include tiles in the video frames (the geometry frames, the attribute frames, and the occupancy frames) and the atlas frames. Embodiments of the present disclosure also provide systems and methods to use a message or syntax value to indicate a specific relationship between the tiles of the video frames and the atlas frames. In certain embodiments, the message or syntax value indicate that the attribute, geometry, occupancy map and atlas frames all use tiles with proportional sizes that are suitable for object based or partial decoding.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, representing a point cloud, to one or more display devices, such as a client device 106-116. In certain embodiments, each server 104 can include an encoder.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and an HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display a 360° scene including one or more 3D point clouds. In certain embodiments, any of the client devices 106-116 can include an encoder, decoder, or both. For example, the mobile device 108 can record a video and then encode the video enabling the video to be transmitted to one of the client devices 106-116. In another example, the laptop computer 112 can be used to generate a virtual 3D point cloud, which is then encoded and transmitted to one of the client devices 106-116.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress a point cloud, generate a bitstream that represents the point cloud, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-116 or the server 104 can create a 3D point cloud, compress a 3D point cloud, transmit a 3D point cloud, receive a 3D point cloud, render a 3D point cloud, or a combination thereof. For example, the server 104 receives a 3D point cloud, decomposes the 3D point cloud to fit on 2D frames, compresses the frames to generate a bitstream. The bitstream can be transmitted to a storage device, such as an information repository, or one or more of the client devices 106-116. For another example, one of the client devices 106-116 can receive a 3D point cloud, decompose the 3D point cloud to fit on 2D frames, compress the frames to generate a bitstream that can be transmitted to a storage device, such as an information repository, another one of the client devices 106-116, or to the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
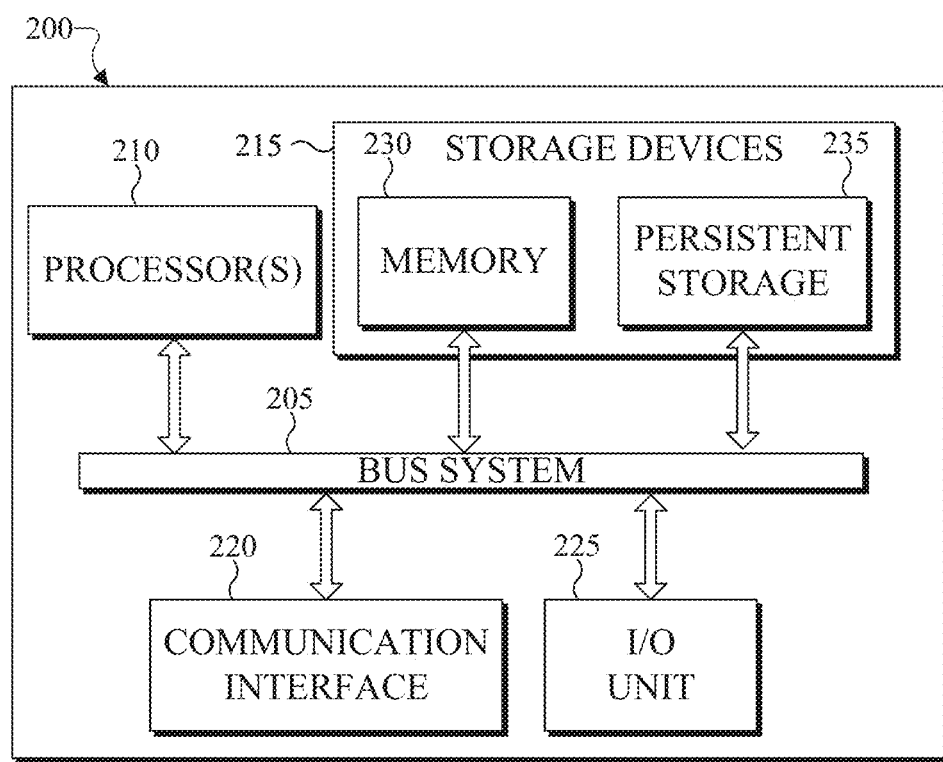
FIGS. 2 and 3 illustrate example electronic devices in accordance with an embodiment of this disclosure.
Figure 3:
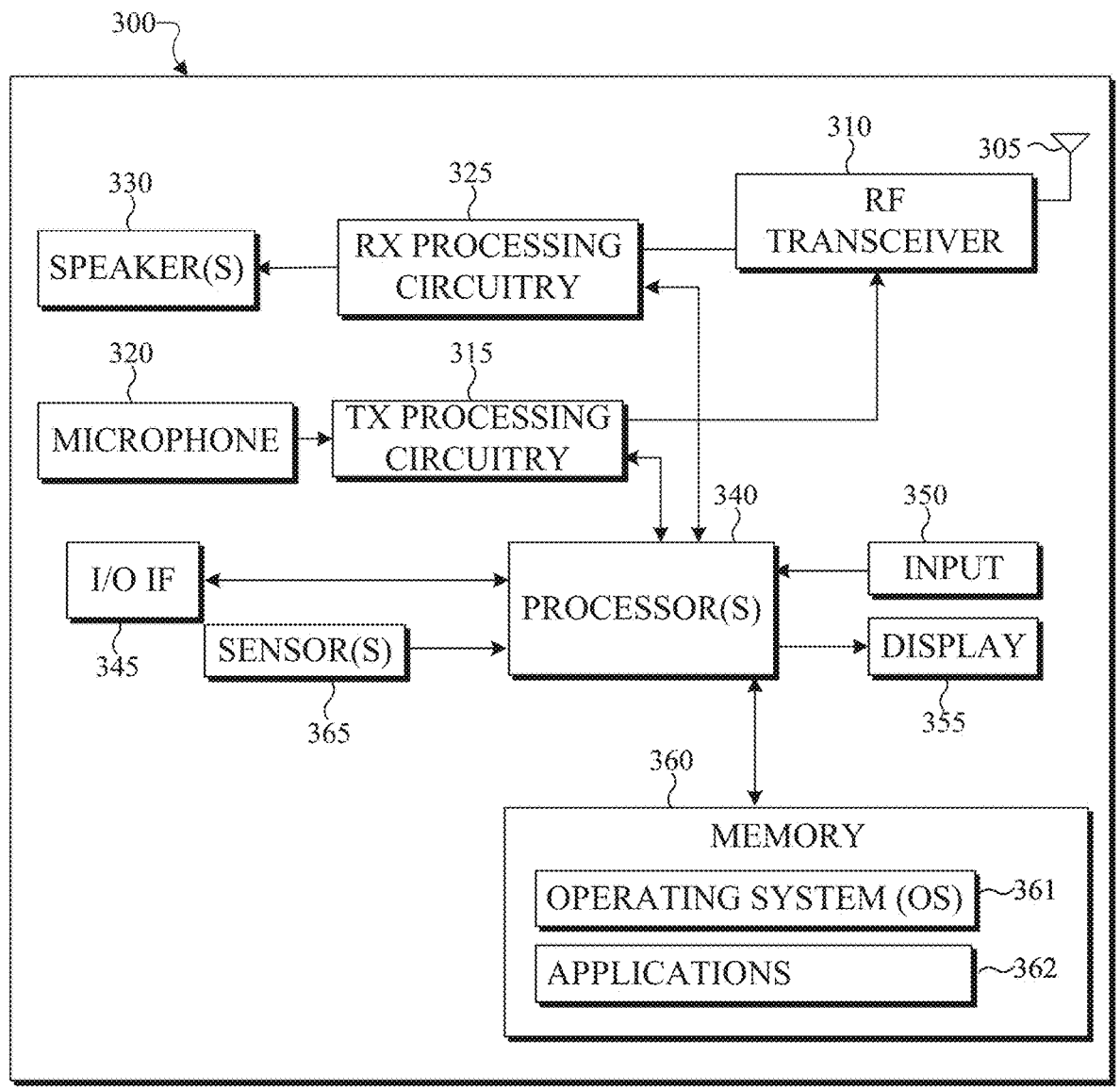

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

The server 200 can represent one or more local servers, one or more compression servers, or one or more encoding servers, such as an encoder. In certain embodiments, the server 200 can perform decoding. As shown in FIG. 2, the server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry. In certain embodiments, the processor 210 can encode a 3D point cloud stored within the storage devices 215. In certain embodiments, when the 3D point cloud is encoded by an encoder, the encoder also decodes the encoded 3D point cloud to ensure that when the point cloud is reconstructed, the reconstructed 3D point cloud matches the 3D point cloud prior to the encoding.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random-access memory or any other suitable volatile or non-volatile storage device(s). For example, the instructions stored in the memory 230 can include instructions for decomposing a point cloud into patches, instructions for packing the patches on 2D frames, instructions for compressing the 2D frames, as well as instructions for encoding 2D frames in a certain order in order to generate a bitstream. The instructions stored in the memory 230 can also include instructions for rendering a 360° scene, as viewed through a VR headset, such as HMD 116 of FIG. 1. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing a 3D point cloud to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image, or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 downconverts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within an HMD. The display 355 can be a singular display screen or multiple display screens capable of creating a stereoscopic display. In certain embodiments, the display 355 is a heads-up display (HUD). The display 355 can display 3D objects, such as a 3D point cloud.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

As discussed in greater detail below, one or more of these sensor(s) 365 may be used to control a user interface (UI), detect UI inputs, determine the orientation and facing the direction of the user for three-dimensional content display identification, and the like. Any of these sensor(s) 365 may be located within the electronic device 300, within a secondary device operably connected to the electronic device 300, within a headset configured to hold the electronic device 300, or in a singular device where the electronic device 300 includes a headset.

The electronic device 300 can create media content such as generate a 3D point cloud or capture (or record) content through a camera. The electronic device 300 can encode the media content to generate a bitstream (similar to the server 200, described above), such that the bitstream can be transmitted directly to another electronic device or indirectly such as through the network 102 of FIG. 1. The electronic device 300 can receive a bitstream directly from another electronic device or indirectly such as through the network 102 of FIG. 1.

When encoding media content, such as a point cloud, the electronic device 300 or the server 200 of FIG. 2 can project the point cloud into multiple patches. For example, a cluster of points of the point cloud can be grouped together and represented as a patch on the 2D frames. A patch can represent a single attribute of the point cloud from a particular map (or layer). Patches that represent the same attribute and belong to the same map can be packed into individual 2D frames, respectively. For example, a particular attribute from all the points belonging to a particular map forms a 2D frame. The 2D frames are then encoded to generate a bitstream. During the encoding process additional content such as metadata, flags, parameter sets, syntax elements, occupancy maps, geometry smoothing parameters, one or more attribute smoothing parameters, an atlas sub-bitstream, and the like can be included in the bitstream.

Similarly, when decoding media content included in a bitstream that represents a 3D point cloud, the electronic device 300 decodes the received bitstream into frames. In certain embodiments, the decoded bitstream also includes an occupancy map, 2D frames, auxiliary information (such as one or more flags, one or more syntax elements, or quantization parameter size), and the like. A geometry frame can include pixels that indicate geographic coordinates of points of the point cloud in 3D space. Similarly, an attribute frame can include pixels that indicate the RGB (or YUV) color (or any other attribute) of each geometric point in 3D space. The auxiliary information can include one or more flags, one or more syntax elements, or quantization parameter size, one or more thresholds, geometry smoothing parameters, one or more attribute smoothing parameters, or any combination thereof. After reconstructing the 3D point cloud, the electronic device 300 can render the 3D point cloud in three dimensions via the display 355.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

FIGS. 4A, 4B, 4C, and 4D illustrate various stages in generating frames that represent a 3D point cloud. In particular, FIG. 4A illustrate an example 3D point cloud 400 in accordance with an embodiment of this disclosure. FIG. 4B illustrates a diagram 405 of a point cloud that is surrounded by multiple projection planes in accordance with an embodiment of this disclosure. FIGS. 4C and 4D illustrate 2D frames that include patches representing the 3D point cloud 400 of FIG. 4A in accordance with an embodiment of this disclosure. For example, the FIG. 4C illustrates a 2D frame 430 that represents the geometric position of points of the 3D point cloud 400, while the FIG. 4D illustrates the frame 440 that represents the color associated with points of the 3D point cloud 400. In certain embodiments, the reconstructed point cloud 450 represents the 3D point cloud 400 of FIG. 4A, but reconstructed for rendering on a user device, while the 3D point cloud 400 of FIG. 4A can be located on a server.

The 3D point cloud 400 of FIG. 4A is a set of data points in 3D space. Each point of the 3D point cloud 400 includes a geometric position that provides the structure of the 3D point cloud and one or more attributes that provide information about each point such as color, reflectiveness, material, and the like. The 3D point cloud 400 represents the entire 360° object. That is, the point cloud can be viewed from various angles such as the front 402, the sides, and the back 402, the top, the bottom.

The diagram 405 of FIG. 4B includes a point cloud 406. The point cloud 406 can be similar to the 3D point cloud 400 of FIG. 4A. That is, the point cloud 406 represents an entire 360° object. The point cloud 406 is surrounded by multiple projection planes, such as the projection plane 410, 412, 414, 416, 418, and 420. The projection plane 410 is separated from the projection plane 412 by a predefined distance. For example, the projection plane 410 corresponds to the projection plane XZ0 and the projection plane 412 corresponds to the projection plane XZ1. Similarly, the projection plane 414 is separated from the projection plane 416 by a predefined distance. For example, the projection plane 414 corresponds to the projection plane YZ0 and the projection plane 416 corresponds to the projection plane YZ1. Additionally, the projection plane 418 is separated from the projection plane 420 by a predefined distance. For example, the projection plane 418 corresponds to the projection plane XY0 and the projection plane 420 corresponds to the projection plane XY1. It is noted that additional projection planes can be included and the shape that the projection planes form can differ.

During the segmentation process, each of the points of the point cloud 406 are assigned to a particular projection plane, (such as the projection planes 410, 412, 414, 416, 418, and 420). The points that are near each other and are assigned to the same projection plane are grouped together to form a cluster which is represented as a patch such as any of the patches as illustrated in FIGS. 4C and 4D. More or less projection planes can be used when assigning points to a particular projection plane. Moreover, the projection planes can be at various locations and angles. For example, certain projection planes can be at a 45 degree incline with respect to the other projection planes, Similarly, certain projection planes can be at a 90 degree angle with respect to other projection planes, FIGS. 4C and 4D illustrate the 2D frames 430 and 440, respectively. The frame 430 is a geometry frame as it illustrates the geometric location of each point of the 3D point cloud 400 of FIG. 4A. The frame 430 includes multiple patches (such as a patch 432) representing the depth values of the 3D point cloud 400. The value of each pixel in the frame 430 is represented as a lighter or darker color and corresponds to a distance each pixel is from a particular projection plane (such as one of the projection planes 410, 412, 414, 416, 418, and 420 of FIG. 4B).

The frame 440 is a color frame (one type of attribute) as it provides the color of each point of the 3D point cloud 400 of FIG. 4A. The frame 440 includes multiple patches (such as a patch 442) representing values corresponding to the color of a point in the 3D point cloud 400.

Each of the patches in FIGS. 4C and 4D can be identified by an index number. Similarly, each pixel within a patch can be identified by its location within the frame as well as the index number of the patch to which the pixel is within. The patch index number can be stored in an atlas frame.

A correspondence (or mapping) exists between the frame 430 and the frame 440. That is, each pixel in the frame 430 corresponds to a pixel at the same location in the frame 440. Each pixel of color in the frame 440 corresponds to a particular geometry pixel in the frame 430. For example, a mapping is generated between each pixel in the frame 430 and the frame 440. For example, each pixel within the patch 432 corresponds to a point in 3D space, and each pixel within the patch 442 provides a color to a point of the 3D point cloud that is represented at the same location in the patch 432. As shown in the frames 430 and 440, some of the pixels correspond to valid pixels that represent the 3D point cloud 400 while other pixels (the black area in the background) correspond to invalid pixels that do not represent the 3D point cloud 400. In certain embodiments, the black area in the background could be filled with values for padding purposes. In certain embodiments, geometry frames (such as the frame 430), attribute frames (such as the frame 440), and occupancy map frames can be down sampled, so the correspondence does not match up exactly.

In certain embodiments, the frames 430 and 440 could be partitioned into multiple units known as tiles. To apply tiles in the frames 430 and 440, the encoder determines locations for vertical and horizontal lines to form the video tiles. The encoder creates a minimum number of video tiles for compression efficiency.

The frames 430 and 440 can be encoded with a video codec such as HEVC, AVC, VP9, VP8, VVC, AV1, and the like. A decoder receives a bitstream that includes the frames 430 and 440 and reconstructs the geometry of the 3D point cloud from the frame 430 and colors the geometry of the point cloud based on the frame 440 in order to generate the reconstructed point cloud. In certain embodiments, the when the video frames are encoded, for each corresponding video tile (or a group of tiles), motion is constrained within that video tile (or group of tiles).

Although FIGS. 4A, 4B, 4C, and 4D illustrate example point cloud and 2D frames representing a point cloud, various changes can be made to FIGS. 4A, 4B, 4C, and 4D. For example, a point cloud or mesh can represent a single object, whereas in other embodiments, a point cloud or mesh can represent multiple objects, scenery (such as a landscape), a virtual object in AR, and the like. In another example, the patches included in the 2D frames can represent other attributes, such as luminance, material, and the like. FIGS. 4A, 4B, 4C, and 4D do not limit this disclosure to any particular 3D object(s) and 2D frames representing the 3D object(s).

Figure 5A:
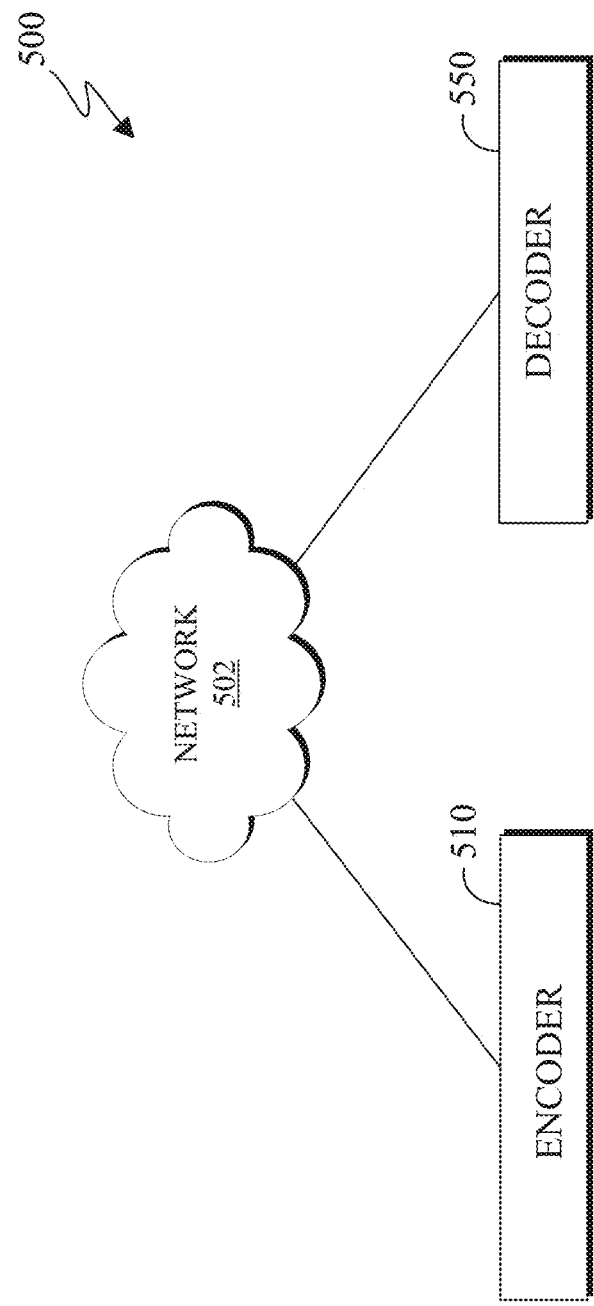
FIG. 5A illustrates a block diagram of an example environment-architecture in accordance with an embodiment of this disclosure.
Figure 5B:
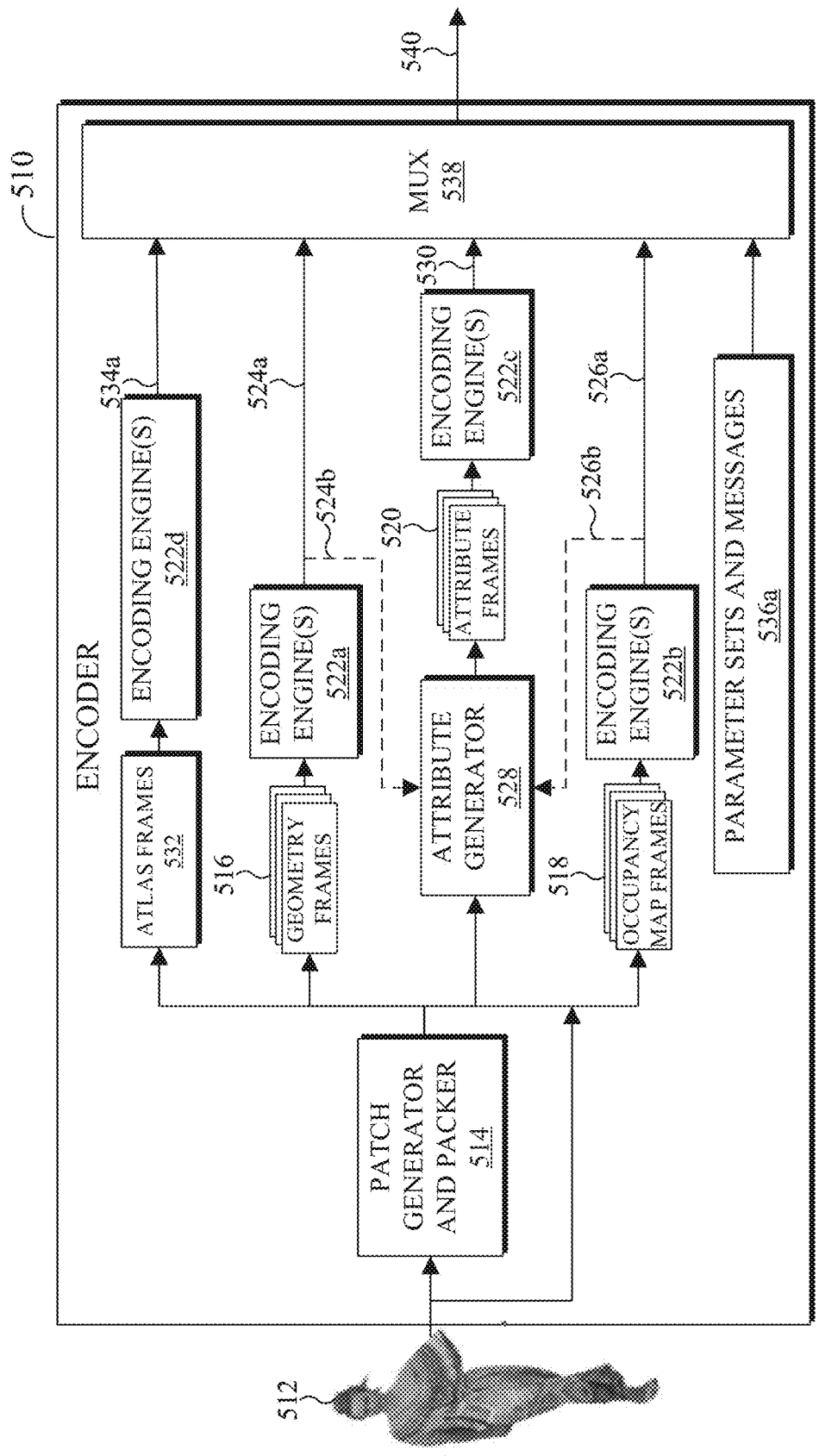
FIG. 5B illustrates an example block diagram of an encoder in accordance with an embodiment of this disclosure.
Figure 5C:
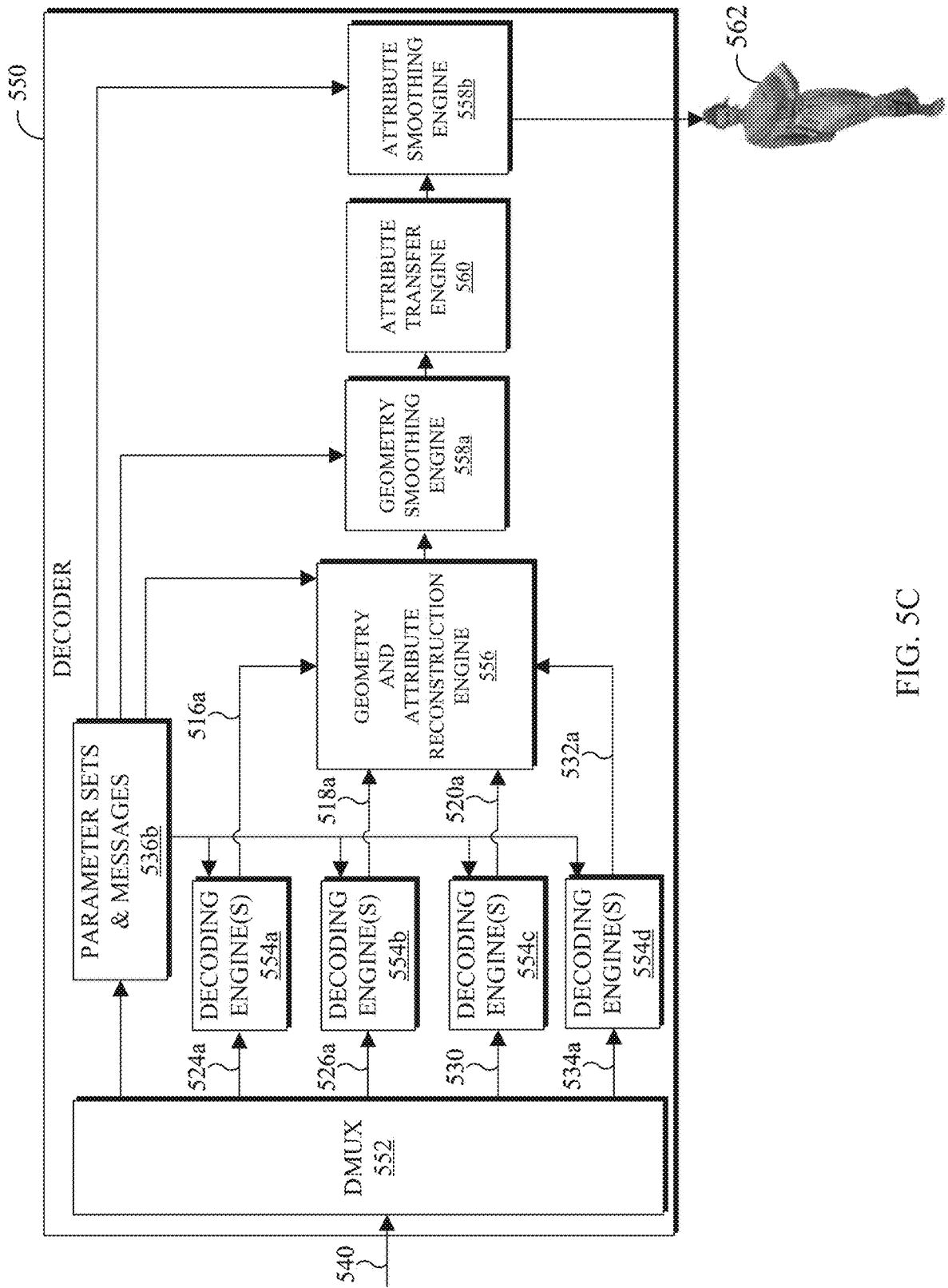
FIG. 5C illustrates an example block diagram of a decoder in accordance with an embodiment of this disclosure.

FIGS. 5A, 5B, and 5C illustrate block diagrams in accordance with an embodiment of this disclosure. In particular, FIG. 5A illustrates a block diagram of an example environment-architecture 500 in accordance with an embodiment of this disclosure. FIG. 5B illustrates an example block diagram of the encoder 510 of FIG. 5A and FIG. 5C illustrates an example block diagram of the decoder 550 of FIG. 5A in accordance with an embodiment of this disclosure. The embodiments of FIGS. 5A, 5B, and 5C are for illustration only. Other embodiments can be used without departing from the scope of this disclosure.

As shown in FIG. 5A, the example environment-architecture 500 includes an encoder 510 and a decoder 550 in communication over a network 502. The encoder 510 is described in greater detail in FIG. 5B, below. The decoder 550 is described in greater detail in FIG. 5C, below.

The network 502 can be the same as or similar to the network 102 of FIG. 1. In certain embodiments, the network 502 represents a "cloud" of computers interconnected by one or more networks, where the network is a computing system utilizing clustered computers and components that act as a single pool of seamless resources when accessed. Also, in certain embodiments, the network 502 is connected with one or more servers (such as the server 104 of FIG. 1, the server 200), one or more electronic devices (such as the client devices 106-116 of FIG. 1, the electronic device 300), the encoder 510, and the decoder 550. Further, in certain embodiments, the network 502 can be connected to an information repository (not shown) that contains a VR and AR media content that can be encoded by the encoder 510, decoded by the decoder 550, or rendered and displayed on an electronic device.

In certain embodiments, the encoder 510 and the decoder 550 can represent the server 104, one of the client devices 106-116 of FIG. 1, the server 200 of FIG. 2, the electronic device 300 of FIG. 3, or another suitable device. In certain embodiments, the encoder 510 and the decoder 550 can be a "cloud" of computers interconnected by one or more networks, where each is a computing system utilizing clustered computers and components to act as a single pool of seamless resources when accessed through the network 502. In some embodiments, a portion of the components included in the encoder 510 or the decoder 550 can be included in different devices, such as multiple servers 104 or 200, multiple client devices 106-116, or other combination of different devices. In certain embodiments, the encoder 510 is operably connected to an electronic device or a server while the decoder 550 is operably connected to an electronic device. In certain embodiments, the encoder 510 and the decoder 550 are the same device or operably connected to the same device.

Generally, the encoder 510, as shown in FIGS. 5A and 5B, receives 3D media content, such as a point cloud, from another device such as a server (similar to the server 104 of FIG. 1, the server 200 of FIG. 2), an information repository (such as a database), or one of the client devices 106-116. In certain embodiments, the encoder 510 can receive media content from multiple cameras and stitch the content together to generate a 3D scene that includes one or more point clouds.

The encoder 510 projects points of the point cloud into multiple patches that represent the projection. The encoder 510 clusters points of a point cloud into groups which are projected onto different planes such as an XY plane, an YZ plane, and an XZ plane. Each cluster of points is represented by a patch when projected onto a plane. The encoder 510 packs and stores information representing the onto a 2D frame. The encoder 510 packs the patches representing the point cloud onto 2D frames. The 2D frames can be video frames. It is noted, a point of the 3D point cloud is located in 3D space based on a (X, Y, Z) coordinate value, but when the point is projected onto a 2D frame the pixel representing the projected point is denoted by the column and row index of the frame indicated by the coordinate (u, v). Additionally, 'u' and 'v' can range from zero to the number of rows or columns in the depth image, respectively.

Each of the 2D frames (such as the geometry frames 516 and the attribute frames 520) represents a particular aspect of the point cloud, such as one set of frames can represent geometry and another set of frames can represent an attribute (such as color). It should be noted that additional frames can be generated based on more layers as well as each additionally defined attribute.

The encoder 510 also generates an occupancy map frames 518 based on the geometry frames 516 to indicate which pixels within the frames are valid. Generally, the occupancy map indicates, for each pixel within a frame, whether the pixel is a valid pixel or an invalid pixel. For example, if a pixel in the occupancy map at coordinate (u, v) is valid, then the corresponding pixel in a geometry frame and the corresponding attribute frame at the coordinate (u, v) are also valid. If the pixel in the occupancy map at coordinate (u, v) is invalid, then the decoder skips the corresponding pixel in the geometry and attribute frames at the coordinate (u, v) for reconstruction purposes. An invalid pixel can include information such as padding that can increase the encoding efficiency but does not provide any information associated with the point cloud itself. Generally, the occupancy map is binary, such that the value of each pixel is either one or zero. For example, when the value of a pixel at position (u, v) of the occupancy map is one, indicates that a pixel at (u, v) of an attribute frame and the geometry frame is valid. In contrast, when the value of a pixel at position (u, v) of the occupancy map is zero indicates that a pixel at (u, v) of the attribute frame and the geometry frame is invalid, and therefore does not represent a point of the 3D point cloud. A non-binary occupancy map may be thresholded or processed to generate a binary occupancy map.

The encoder also generates atlas frames 532 that include information relating the pixels of the video frames to the point cloud. For example, the atlas frames 532 can indicate a 3D location of a patch that is stored in the video frames. The atlas frames 532 can also indicate where the patches are located on a 2D grid of a video frame. The atlas frames can also indicate the size of a patch (such as the number of pixels that correspond to a patch).

The encoder 510 transmits frames representing the point cloud as an encoded bitstream. The bitstream can be transmitted to an information repository (such as a database) or an electronic device that includes a decoder (such as the decoder 550), or the decoder 550 itself through the network 502. The encoder 510 is described in greater detail below in FIG. 5B.

As illustrated in FIG. 5B, the encoder 510 receives a 3D point cloud 512 and generates a bitstream 540. The bitstream 540 includes data representing a 3D point cloud 512. The bitstream 540 can include multiple bitstreams that are multiplexed together via a multiplexer 538. The bitstream 540 can be transmitted via the network 502 of FIG. 5A to another device, such as the decoder 550, an electronic device that includes the decoder 550, or an information repository. The encoder 510 also includes a patch generator and packer 514, one or more encoding engines (such as encoding engine 522a, 522b, 522c, and 522d which are collectively referred to as encoding engines 522), and an attribute generator 528.

The 3D point cloud 512 can be stored in memory (not shown) or received from another electronic device (not shown). The 3D point cloud 512 can be a single 3D object (similar to the 3D point cloud 400 of FIG. 4A), or a grouping of 3D objects. The 3D point cloud 512 can be a stationary object or an object which moves.

The patch generator and packer 514 is used for generating geometry frames 516, occupancy map frames 518, attribute information (which is used by the attribute generator 528 to generate the attribute frames 520), and atlas frames 532 (which includes patch information providing information about the patches, such as an index number that is associated with each patch).

The patch generator and packer 514 generates patches by taking projections of the 3D point cloud 512 and packs the patches into frames. In certain embodiments, the patch generator and packer 514 splits the geometry information and attribute information of each point of the 3D point cloud 512. The patch generator and packer 514 can use two or more projection planes (such as two or more the projection plans 410-420 of FIG. 4B), to cluster the points of the 3D point cloud 512 to generate the patches. The geometry patches are eventually packed into the geometry frames 516.

The patch generator and packer 514 determines the best projection plane for each point of the 3D point cloud 512. When projected, each cluster of points of the 3D point cloud 512 appears as patch (also referred to as a regular patch). A single cluster of points can be represented by multiple patches (located on different frames), where each patch represents a particular aspect of each point within the cluster of points. For example, a patch representing the geometry locations of the cluster of points is located on the geometry frame 516, and patch representing an attribute of the cluster of points is located on the attribute frame 520.

After determining the best projection plane for each point of the 3D point cloud 512 the patch generator and packer 514 segments the points into patch data structures that are packed frames, such as the geometry frames 516. As illustrated in FIGS. 4C and 4D, discussed above, the patches are organized and placed within corresponding frames, such as the patch 432 is included in the geometry frame 430 and the patch 442 is included in the attribute frame 440. It is noted that patches representing different attributes of the same cluster of points include a correspondence or a mapping, such a pixel in one patch corresponds to the same pixel in another patch, based on the locations of the pixels being at the same position in the respective frames.

The occupancy map frames 518 represent occupancy maps that indicate the valid pixels in the frames (such as the geometry frames 516). For example, the occupancy map frames 518 indicate whether each pixel in the geometry frame 516 is a valid pixel or an invalid pixel. Each valid pixel in the occupancy map frames 518 corresponds to pixels in the geometry frames 516 that represents a position point of the 3D point cloud 512 in 3D space. In contrast, the invalid pixels are pixels within the occupancy map frames 518 that correspond to pixels in the geometry frames 516 that do not represent a point of the 3D point cloud 512 (such as the empty/black space in the frames 430 and 440 of FIGS. 4C and 4D). In certain embodiments, one of the occupancy map frames 518 can correspond to both a geometry frame 516 and an attribute frame 520 (discussed below).

For example, when the patch generator and packer 514 generates the occupancy map frames 518, the occupancy map frames 518 include predefined values for each pixel, such as zero or one. For example, when a pixel of the occupancy map at position (u, v) is a value of zero, indicates that the pixel at (u, v) in the geometry frame 516 is invalid. Similarly, when a pixel of the occupancy map at position (u, v) is a value of one, indicates that the pixel at (u, v) in the geometry frame 516 is valid and thereby includes information representing a point of the 3D point cloud.

The geometry frames 516 include pixels representing the geometry values of the 3D point cloud 512. The geometry frames 516 include the geographic information of points of the 3D point cloud 512. For example, the two transverse coordinates (with respect to the projection plane) of a 3D point corresponds to the column and row indices in the geometry video frame (u, v) plus a transverse-offset which indicates the location of the entire patch within the video frame. The depth of the 3D point is encoded as the value of the pixel in the video frame plus a depth-offset for the patch. The depth of the 3D point cloud depends on whether the projection of the 3D point cloud is taken from the XY, YZ, or XZ coordinates.

In certain embodiments, the atlas frames 532 contain information about the patches. For example, the atlas frames 532 include positioning of the patches in the 2D frame, the offsets for the patch segment in the 3D point cloud space, the plane on which the patch is projected on, and the like. The atlas frames 532 can include information that relates the patches that are stored in the geometry frames 516 and occupancy map frames 518 to location on the 3D point cloud 512. The atlas frames can also indicate the size of a patch (such as the number of pixels that correspond to a patch).

The encoder 510 can also divide the video frames (such as the geometry frames 516, the occupancy map frames 518, and the attribute frames 520) and the atlas frames into tile-partitions. One or more tile partitions can be combined into a tile. The tile-partitions as well as tiles may vary in size. FIGS. 6-9, below, illustrate various frames, tiles, and tile partitions.

Furthermore, in certain embodiments, each tile (or group of tiles) of the video frames (such as the geometry frames 516, the occupancy map frames 518, and the attribute frames 520) and the atlas frames 532 may be encoded (by the encoding engines 522) and decoded independently (by the decoding engines 554 of FIG. 5C) without referring to data from other tiles (or group of tiles). For example, if the decoder 550 is only interested in a specific object or portion of a point cloud (or area of infests), the decoder can decode only the atlas tiles that are associated with that object (or area of interest).

It is noted that if the atlas frame 532 is partitioned into tiles but the video frames (such as the geometry frames 516, the occupancy map frames 518, and the attribute frames 520) are not (such that the frame itself is a single tile), then only the atlas frame can be partially decoded by the decoder 550, which provides limited savings. Therefore, if the video frames (such as the geometry frames 516, the occupancy map frames 518, and the attribute frames 520) also use tiles, then a decoder (such as the decoder 550 of FIGS. 5A and 5C) can decode only the video tiles and the atlas tiles that are associated with the object of interest. Accordingly, embodiments of the present disclosure provide systems and methods to relate tile sizes of different frames with respect to each other.

For the decoder 550 to decode an area of interest, the encoder 510 sets a value for a syntax element that is included in the parameter sets and messages 536a. The value of the syntax element specifies relationships between the sizes of the tiles in the video frames (such as the geometry frames 516, the occupancy map frames 518, and the attribute frames 520) and the atlas frames 532.

For example, the value of the syntax element indicates whether the video frames (such as the geometry frames 516, the occupancy map frames 518, and the attribute frames 520) are tiled. The value of the syntax element also indicates whether motion is constrained within each tile. The value of the syntax element also indicates whether the tile sizes for the video frames (such as the geometry frames 516, the occupancy map frames 518, and the attribute frames 520) are similar to the sizes of the tiles used in the atlas.

The encoder 510 determines how the tiles of the video frames and the tiles of the atlas frames 532 are related and then sets the value of the syntax element based on the relationship. That is, based on the value of the syntax element a particular set of conditions that relate the tiles of the video frames (such as the geometry frames 516, the occupancy map frames 518, and the attribute frames 520) to the tiles of the atlas frames 532 are satisfied. In certain embodiments, the syntax element is an SEI message. In other embodiments, the syntax element is a volumetric usability information (VUI) signal. FIGS. 6, 7, 8, and 9, illustrate the various relationships the between sizes of the video tiles and sizes of the atlas tiles.

The encoder 510 includes one or more encoding engines 522. In certain embodiments, the video frames (such as the geometry frames 516, the occupancy map frames 518, and the attribute frames 520) and the atlas frames 532 are encoded by independent encoding engines 522, as illustrated. In other embodiments, a single encoding engine performs the encoding of the frames.

The encoding engines 522 can be configured to support an 8-bit, a 10-bit, a 12-bit, a 14-bit, or a 16-bit, precision of data. The encoding engines 522 can include a video or image codec such as HEVC, AVC, VP9, VP8, VVC, EVC, AV1 and the like to compress the 2D frames representing the 3D point cloud. The one or more of the encoding engines 522 can compress the information in a lossy or lossless manner.

As illustrated, the encoding engine 522a receives geometry frames 516 and performs geometry compression to generate a geometry sub-bitstream 524a. The encoding engine 522b receives occupancy map frames 518 and performs occupancy map compression to generate an occupancy map sub-bitstream 526a. The encoding engine 522c receives attribute frames 520 and performs attribute compression to generate an attribute sub-bitstream 530. The encoding engine 522d receives atlas frames 532 and performs compression to generate an atlas sub-bitstream 534a. In certain embodiments, the atlas is not compressed.

In certain embodiments, the encoding engines 522 can subsample the video frames (such as the geometry frames 516, the occupancy map frames 518, and the attribute frames 520) and the atlas frames 532 differently. For example, the atlas frames 532 can be sized 1024×1024, the geometry frames 516 can be sized 512×512, the occupancy map frames 518 can be sized 256×256, and the attribute frames 520 can be sized 128×128. The sizes in this example are for explanation only and other sizes for the frames can be used. Additionally, some of the frames can be subsampled to the same size.

After the encoding engine 522a generates the geometry sub-bitstream 524a, a decoding engine (not shown) can decode the geometry sub-bitstream 524a to generate the reconstructed geometry frames 524b. Similarly, after the encoding engine 522b generates the occupancy map sub-bitstream 526a, a decoding engine (not shown) can decode the occupancy map sub-bitstream 526a to generate the reconstructed occupancy map frames 526b.

The attribute generator 528 generates the attribute frames 520 based on the attribute information from the 3D point cloud 512 provided by the patch generator and packer 514, the reconstructed geometry frames 524b, the reconstructed occupancy map frames 526b.

In certain embodiments, to generate one of the attribute frames 520 that represent color, the geometry frames 516 are compressed by the encoding engine 522a using a 2D video codec such as HEVC. The geometry sub-bitstream 524a is decoded to generate the reconstructed geometry frames 524b. Similarly, the occupancy map frame 518 is compressed using the encoding engine 522b and then decompressed to generate the reconstructed occupancy map frames 526b. The encoder 510 can then reconstruct the geometric locations of the points of the 3D point cloud based on the reconstructed geometry frames 524b and the reconstructed occupancy map frames 526b. The attribute generator 528 interpolates the attribute values (such as color) of each point from the color values of input point cloud to the reconstructed point cloud and the original point cloud 512. The interpolated colors are then segmented, by the attribute generator 528, to match the same patches as the geometry information. The attribute generator 528 then packs interpolated attribute values into an attribute frame 520 representing color. In other embodiments, the attribute generator can perform other methods for generating the attribute frames.

In certain embodiments, the attribute generator 528 uses the atlas frames 532 when generating the attribute frames 520. For example, if the atlas indicates the locations and sizes of tiles in the geometry frames 516 and occupancy map frames 518, then the attribute generator 528 uses the tile information within the atlas frames 532 when generating the attribute frames 520.

The attribute frames 520 represents one or more different attributes of the point cloud. For example, for one of the geometry frames 516 there can be zero or more corresponding attribute frames 520. The attribute frame can represent attributes such as color, texture, normal, material properties, reflection, motion, and the like. In certain embodiments, one of the attribute frames 520 can include color values for each of the geometry points within one of the geometry frames 516, while another attribute frame can include reflectance values which indicate the level of reflectance of each corresponding geometry point within the same geometry frame 516. Each additional attribute frame 520 represents other attributes associated with a particular geometry frame 516. In certain embodiments, each geometry frame 516 has at least one corresponding attribute frame 520.

In certain embodiments, the video frames (such as the geometry frames 516, the occupancy map frames 518, and the attribute frames 520) and the atlas frames can be the same size. In other embodiments, the video frames and the atlas frames can be different sizes. For example, any one of the video frames (such as the geometry frames 516, the occupancy map frames 518, and the attribute frames 520) can be subsampled in the horizontal direction, the vertical direction, or both. If any of the video frames are subsampled, the value of the syntax element (that describes the relationships between sizes of the video tiles and sizes of the atlas tiles), included in the parameter sets and messages 536a, provides an indication to the decoder 550 as to whether the video frames and the atlas frames use tiling, and the size relationships between the tiles of the atlas frames and tiles of the video frames when converted to the atlas frame resolution. This is also referred to as the nominal size.

The parameter sets and messages 536a can include, in addition to the syntax element described above (relationships between sizes of the video tiles and sizes of the atlas tiles), one or more flags, one or more additional syntax elements, one or more quantization parameter size, one or more thresholds, geometry smoothing parameters, attribute smoothing parameters, or any combination thereof. The smoothing parameters can be utilized by the decoder 550 for improving the visual quality of the reconstructed point cloud.

The multiplexer 538 combines the atlas sub-bitstream 534a, the geometry sub-bitstream 524a, the occupancy map sub-bitstream 526a, and the attribute sub-bitstream 530, to create the bitstream 540.

In certain embodiments, there is a nominal height and width associated with the video frames (such as the geometry frames 516, the occupancy map frames 518, and the attribute frames 520) and the atlas frames 532. For example, the nominal height the bitstream 540 can be denoted as vps_frame_height[k] and vps_frame_width[k], where k refers to the atlas index. Similarly, the height and width of the atlas frames 532 can denoted as asps_frame_height and asps_frame_width, respectively. In certain embodiments, the asps_frame_height is equal to vps_frame_height and asps_frame_width is equal to vps_frame_width.

Generally, the decoder 550, of FIGS. 5A and 5C, receives a bitstream (such as the bitstream 540) that represents media content, such as a point cloud. The bitstream 540 can include data representing a 3D point cloud. In certain embodiments, the decoder 550 can decode the bitstream 540 and generate multiple frames such as one or more geometry frames, one or more attribute frames, and one or more occupancy map frames. The decoder 550 reconstructs the point cloud or a portion of the point cloud using the multiple frames, which can be rendered and viewed by a user. The decoder 550 can also perform partial decoding based on relationships between sizes of the video tile and sizes of the atlas tile as indicated by a syntax element.

As illustrated in FIG. 5C, the decoder 550 that includes a demultiplexer 552, one or more decoding engines (such as a decoding engine 554a, a decoding engine 554b, a decoding engine 554c, and a decoding engine 554d), a geometry and attribute reconstruction engine 556, smoothing engines (such as a geometry smoothing engine 558a and an attribute smoothing 558b), and an attribute transfer engine 560.

The decoder 550 receives a bitstream 540, such as the bitstream that was generated by the encoder 510. The demultiplexer 552 separates bitstream 540 into one or more sub-bitstreams representing the different information. For example, the demultiplexer 552 separates various streams of data such into the individual sub-bitstreams such as the parameters sets and messages 536b (which can include the syntax element, geometry smoothing parameters, and attribute smoothing parameters), the geometry sub-bitstream 524a, the occupancy map sub-bitstream 526a, the attribute sub-bitstream 530, and the atlas sub-bitstream 534b. In certain embodiments, the geometry smoothing parameters and the attribute smoothing parameters are not included in the bitstream if the encoder 510 did not perform smoothing.

The decoder 550 includes one or more decoding engines. For example, the decoder 550 can include the decoding engine 554a, a decoding engine 554b, a decoding engine 554c, and a decoding engine 554d (collectively referred to as the decoding engines 554). In certain embodiments, a single decoding engine performs the operations of all of the individual decoding engines 554.

In certain embodiments, the parameter sets and messages 536b provides the syntax element to each of the decoding engines 554. The decoder 550 determines relationships between sizes of the video tiles in the one or more video sub-bitstreams (such as the geometry sub-bitstream 524a, the occupancy map sub-bitstream 526a, and the attribute sub-bitstream 530) and sizes of the atlas tiles in the atlas sub-bitstream. Based on the relationship between the video tiles and the atlas tiles, the decoder 550 can use the decoding engines 554 to estimate portions of the video sub-bitstreams and the atlas sub-bitstream to decode. For example, for a given area of an atlas frame of the atlas frames, the decoder 550 can estimate an area of a first video frame (such as a geometry frame of the geometry sub-bitstream 524a), to decode based on the value of the syntax element. The portions of the video sub-bitstreams and the atlas sub-bitstream that are decoded can include the entirety of the bitstreams or less.

The decoding engine 554a decodes the geometry sub-bitstream 524a into reconstructed geometry 516a. Similarly, the decoding engine 554b decodes the occupancy map sub-bitstream 526a into reconstructed occupancy map frames 518a. Additionally, the decoding engine 554c decodes the attribute sub-bitstream 530 into reconstructed attribute 520a. The decoding engine 554d decodes the atlas sub-bitstream 534a into reconstructed atlas frames 532a. In certain embodiments, if the atlas frames 532 of FIG. 5B was not encoded, then demultiplexer 552 separates the atlas frames 532 from the bitstream (instead of the atlas sub-bitstream 534a) and the atlas frames 532 are not decoded by the decoding engine 554d.

After a portion of the reconstructed geometry 516a, and a portion of the reconstructed occupancy map frames 518a, a portion of the reconstructed attribute 520a, and a portion of the reconstructed atlas frames 532a, are decoded, the geometry and attribute reconstruction engine 556 generates a reconstructed point cloud. As discussed above, the portion of the decoded frames can be the entirety of the frames or less. In certain embodiments, the parameter sets and messages 536b can provide various flags, syntax elements, messages, and the like to the geometry and attribute reconstruction engine 556 for reconstructs the points of the point cloud in 3D space. The geometry and attribute reconstruction engine 556 reconstructs the points of the point cloud in 3D space, based on the reconstructed occupancy map frames 518a, the reconstructed geometry 516a, the reconstructed attribute 520a, the reconstructed atlas frames 532a and any received information from the parameter sets and messages 536b.

The geometry smoothing engine 558a can be enabled or disabled. If the geometry smoothing engine 558a is enabled, then the geometry smoothing engine 558a performs smoothing to the geometry points of the reconstructed point cloud. The geometry smoothing engine 558a can use a geometry smoothing parameter provided by the parameter sets and messages 536b. If the geometry smoothing engine 558a is disabled, then the decoder 550 does not perform geometry smoothing.

In certain embodiments, the decoder 550, via the attribute transfer engine 560, performs attribute transfer step. The attribute transfer engine modifies the attribute information to match the locations of the points in 3D space.

The attribute smoothing engine 558b can be enabled or disabled. If the attribute smoothing engine 558b is enabled, then the attribute smoothing engine 558b performs smoothing to the attribute points of the reconstructed point cloud. The attribute smoothing engine 558b can use an attribute smoothing parameter provided by the parameter sets and messages 536b. In this case, if attribute smoothing is enabled, the attribute smoothing engine 558b smooths the reconstructed attributes based on one or more attribute smoothing parameter. Thereafter the decoder reconstructs the point cloud 562 for rendering. If attribute smoothing is disabled (the decoder 550 can skip the attribute smoothing engine 558b), the reconstructed attributes are directly used to reconstruct point cloud 562 for rendering.

Although FIG. 5A illustrate the environment-architecture 500, FIG. 5B illustrates the encoder 510, and FIG. 5C illustrates the decoder 550, various changes can be made to FIGS. 5A, 5B, and 5C. For example, any number of encoders or decoders can be included environment-architecture 500.

Figure 6:
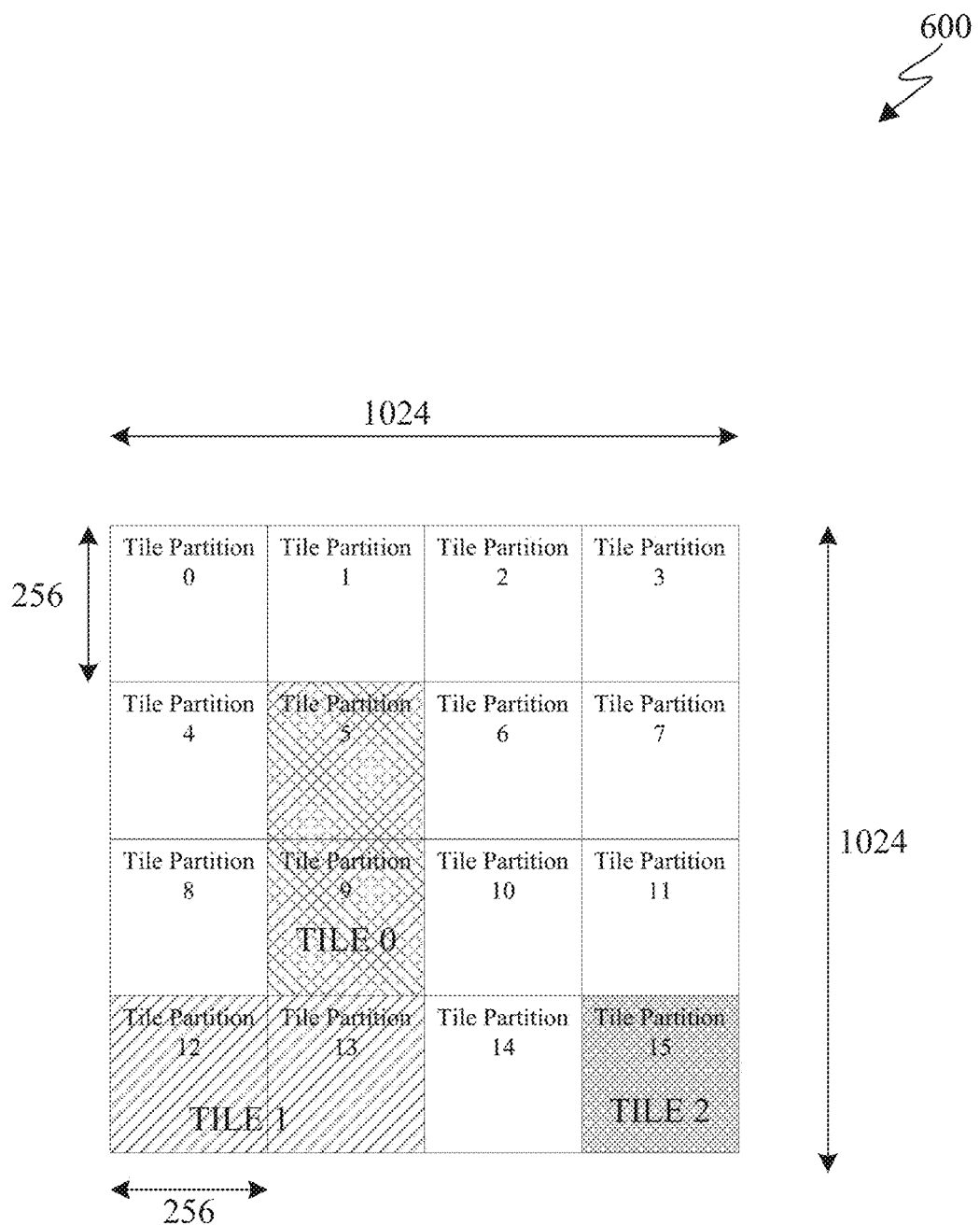
FIG. 6 illustrates an example atlas tile structure in accordance with an embodiment of this disclosure.
Figure 7:
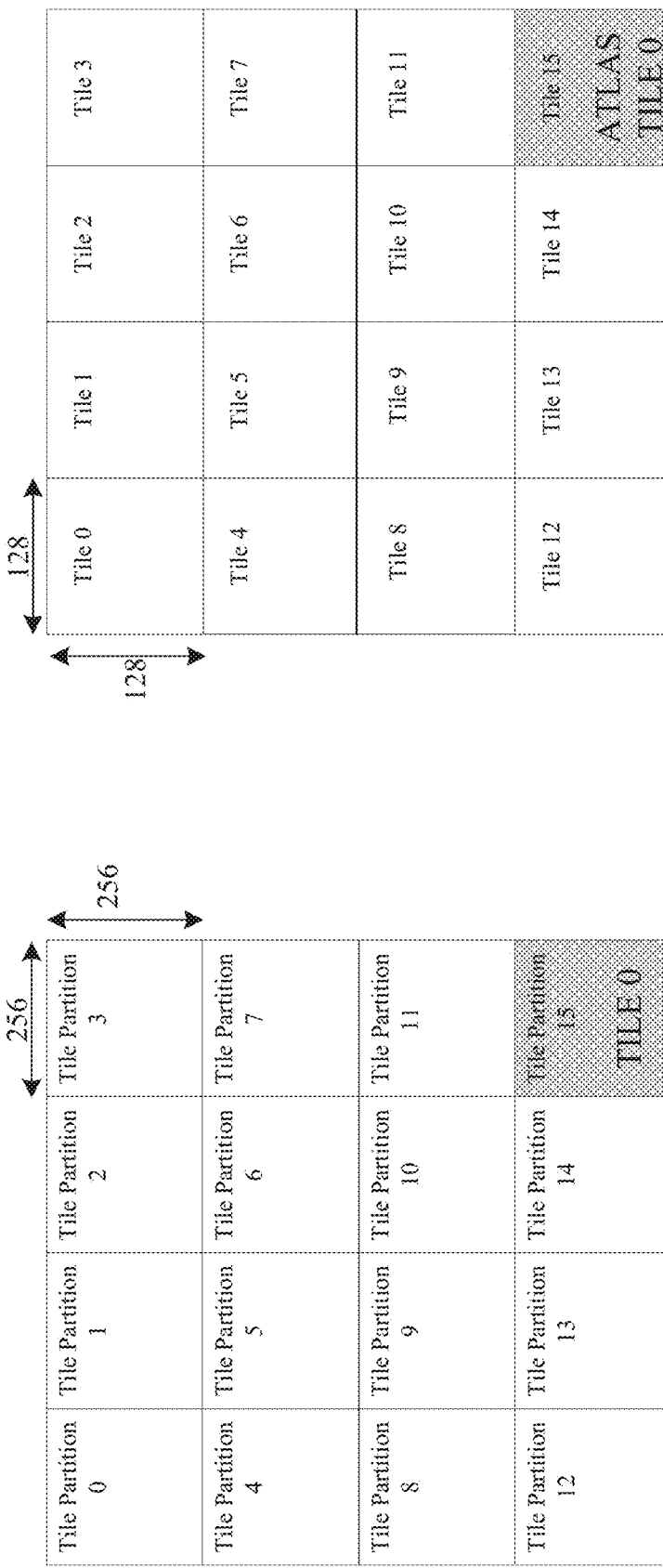
FIGS. 7, 8 and 9 illustrate an example atlas tile structure and a corresponding video tile structure in accordance with an embodiment of this disclosure.
Figure 8:
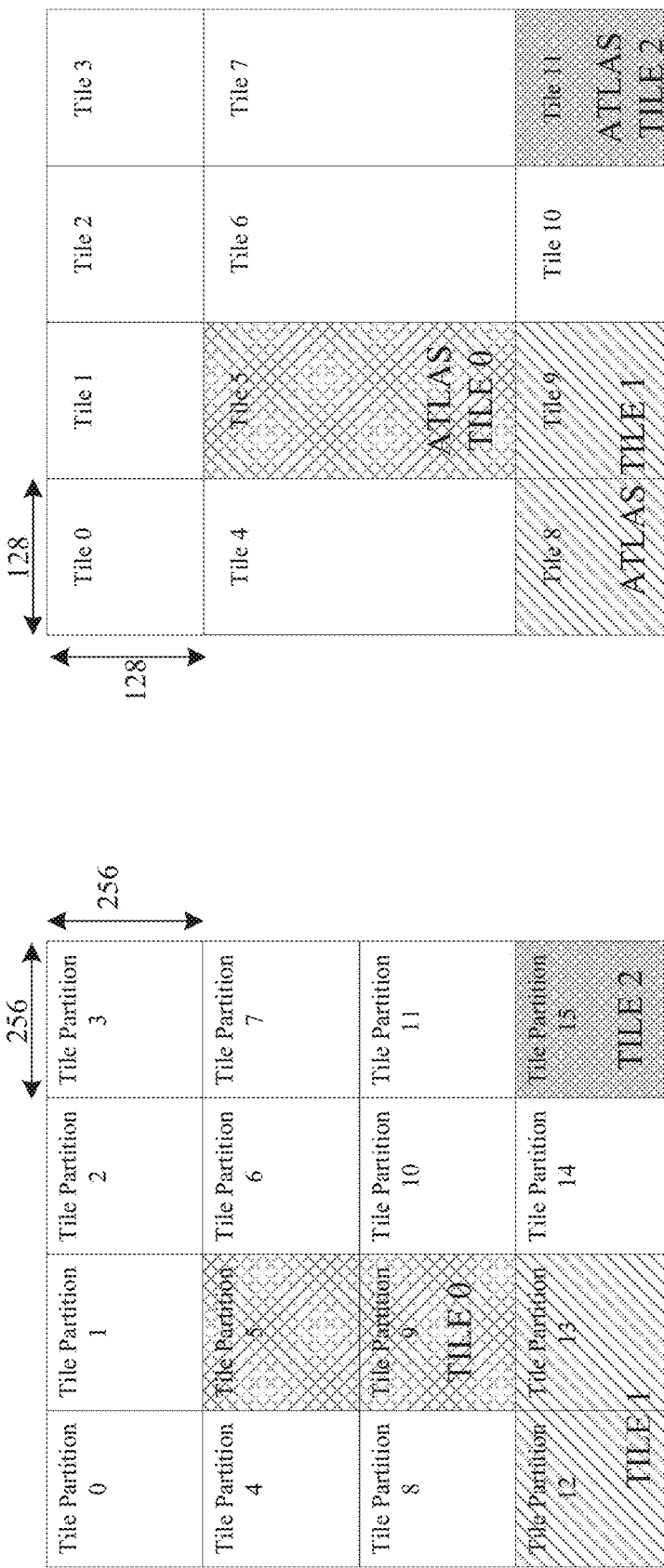
Figure 9:
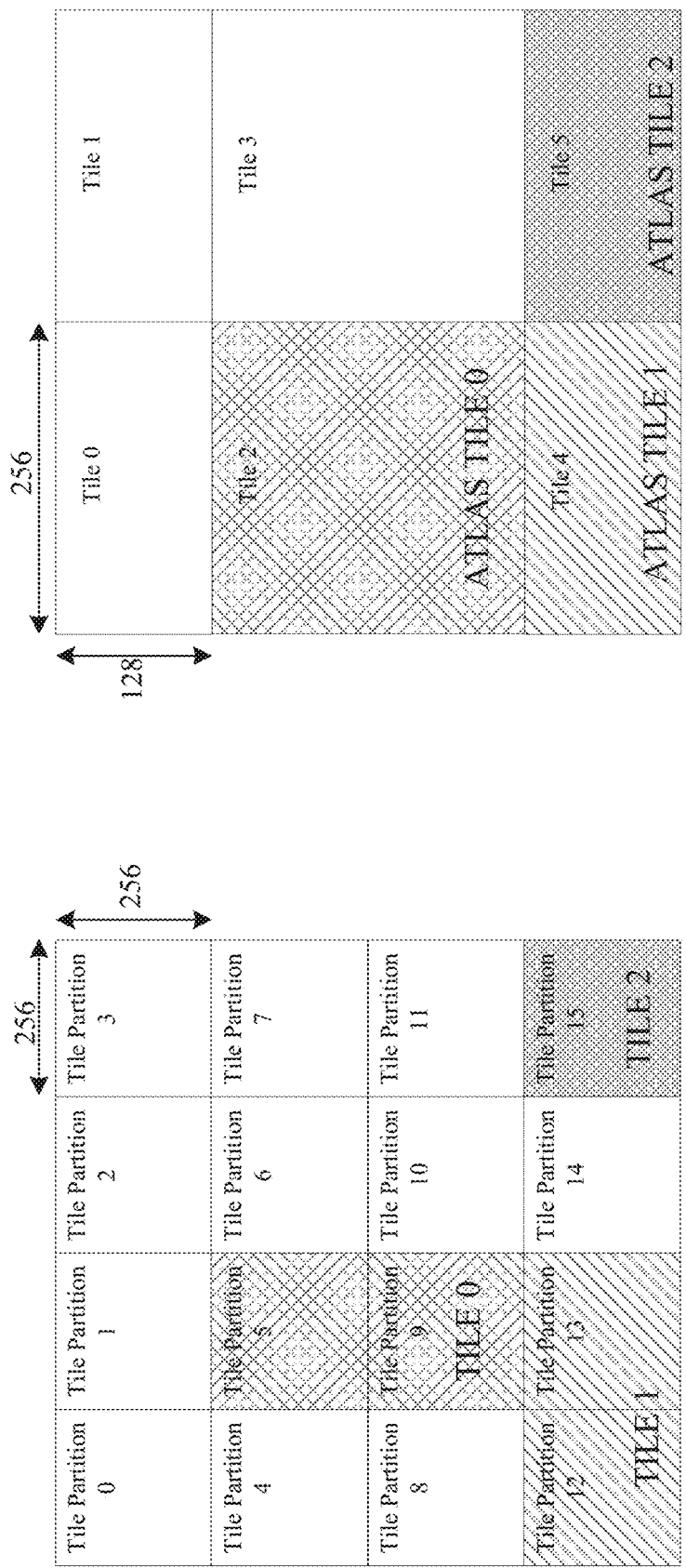

FIG. 6 illustrates an example atlas tile structure 600 in accordance with an embodiment of this disclosure. FIGS. 7, 8, and 9 and illustrate examples of atlas tile structures and corresponding video tile structures in accordance with an embodiment of this disclosure. The example atlas tile structures and video tile structures of FIGS. 6, 7, 8, and 9 are for example only. For example, other tiling structures can be used. The process of creating the atlas tile structures and the video tile structures and identifying the relationships between tile sizes can be performed by the server 104, any of the client devices 106-116 of FIG. 1, the server 200 of FIG. 2, the electronic device 300 of FIG. 3, the encoder 510 of FIGS. 5A and 5B, the decoder 550 of FIGS. 5A and 5C, or any other suitable device or system.

An atlas video frame may be divided into tile-partitions. Additionally, one or more of the tile-partitions may be combined into tiles. It should be noted that the tile-partitions as well as tiles may vary in size. Furthermore, each tile of the atlas frames may be decoded independently without referring to data from other tiles. In certain embodiments, a number of SEI messages and signals (such as those included in the parameter sets and messages 536a) can be used to define objects, track the objects, specify where the objects are positioned with respect to the 2D frame, and to associate the objects with atlas tiles and patches. Thus, if a decoder (such as the decoder 550) is interested in a specific object, the decoder can decode only the atlas tiles and corresponding video tiles that are associated with that object.

FIG. 6 illustrates the atlas tile structure 600 of an atlas frame. The atlas frame is 1024 (H)×1024 (W) in size and divided into 16 tile-partitions of size 256×256. As illustrated the atlas frame includes three tiles. The first tile, denoted as tile 0, includes the tile-partitions 5 and 9. The second tile, denoted as tile 1, includes the tile-partitions 12 and 13. The third tile, denoted as tile 2, includes the tile-partition 15. If tile 0 includes the object of interest, then the atlas decoder (such as the decoding engine 554d of FIG. 5C) can decode only tile 0 to access information associated with the object of interest. Similarly, if tile 0 and tile 1 includes the object of interest, then the atlas decoder (such as the decoding engine 554d of FIG. 5C) can decode tiles 0 and 1 to access information associated with the object of interest.

Embodiments of the present disclosure take into consideration that atlas decoding is not very complex when compared to video decoding. Therefore, embodiments of the present disclosure provide systems and methods for using tiles in the attribute frames, geometry frames, and occupancy map frames (video frames). Embodiments of the present disclosure also provide systems and methods for relating the tiles of the video frames to the tiles of the atlas frames. By relating the tiles of the video frames to the tiles of the atlas frames, the decoder 550 can decode an object of interest from certain tiles from the video frames and the atlas frames for power savings or higher throughput.

Accordingly, a syntax element (or SEI message) can be used to indicate to the decoder whether any of the frames (attribute, geometry, occupancy map, and atlas) are using tiles and whether tile sizes for videos are similar to the tiles used for the atlas. The syntax element (or SEI message) can indicate to the decoder 550 that the tiling across video and atlas frames are consistent so that the decoder 550 may be able to perform partial decoding in an efficient manner.

In certain embodiments, atlas sequence is at full (nominal) resolution whereas video frames (such as the attribute frames, geometry frames, and the occupancy map frames) may be at lower resolution (subsampled). As such, the syntax element, when set by the encoder indicates that the atlas tile sizes, and video tile sizes are related. For example, a full (nominal) resolution may be 1024×1024, while the subsampled resolutions of the video frames (such as the attribute frames, geometry frames, and the occupancy map frames) can be 512×512, 256×256, 128×128, 64×64, and the like. It is noted that the frames may not be square such that a frame size could be 512×256. It is also noted that full (nominal) resolution may be smaller or larger than 1024×1024.

The encoder 510 can set a value of the syntax element based on how the tiling structures satisfy certain conditions. The following three examples describe the conditions that the encoder 510 verifies when setting the value of the syntax element.

In the first example the encoder 510 sets the syntax element to a first value, which is illustrated in FIG. 7. In certain embodiments, the encoder 510 sets the value of the syntax element to a first value when the following conditions are satisfied. The first condition specifies that for each tile in the atlas frame, there is a corresponding video tile for each of the video frames present (attributes, geometry, and occupancy) such that the video tile, when scaled to the nominal format (such as the resolution of the atlas frame), represents exactly the same area on the atlas as the corresponding atlas tile. That is, this condition specifies that for each tile in the atlas frame there is a corresponding tile in each of the video frames.

As illustrated in FIG. 7, the atlas frame is 1024×1024 with 16 tile partitions that are 256×256. The geometry frame is subsampled in both the X and Y directions by a factor of 2, such that the geometry frame is 512×512 with 16 tiles that are 128×128. Accordingly, if the video tile 0 is scaled to the nominal format, (that of 256×256), then the video tile 0 scaled to nominal format has the same size and occupies a similar area as the atlas tile 0 occupies on the atlas frame, thereby satisfying the first condition.

Equation (1) and (2) below describe the relationships between tile sizes. The width and height of the video frame be videoWidth and videoHeight, respectively. The width and height of the video tile be videoTileWidth and videoTileHeight, respectively. The width and height of the atlas tile be atlasTileWidth and atlasTileHeight, respectively.

$$videoTileWidth = atlasTileWidth \times \frac{videoWidth}{asps\_frame\_width} \quad (1)$$

$$videoTileWidth = atlasTileHeight \times \frac{videoHeight}{asps\_frame\_Height} \quad (2)$$

The second condition specifies that the tile structure for attribute, geometry, and occupancy map videos frames remains constant temporally throughout the duration of the point cloud sequence. The third condition specifies that the video tile that corresponds to an atlas tile can be decoded without reference to any information from other tiles from that sub-bitstream. For example, this condition indicates that a video tile is a motion-constrained tile.

That is, for the encoder to set the syntax element to a first value, the encoder 510 chooses the video codec, tile sizes for the atlas and tile sizes for attribute, geometry, and occupancy map video such that the video frames can be partitioned into tiles while satisfying the above conditions.

It is noted that the tiles may not always align as described in the above example. For example, consider a geometry frame with a tiling structure that is similar to the atlas tile structure 600, of the atlas frame of FIG. 6. If the geometry frame was subsampled by 2 in the horizontal and vertical direction, then the size of the geometry video would be sized at 512×512 (while the nominal size of the atlas frame is 1024×1024, as shown in FIG. 6). If HEVC is used to code geometry video frame, it is not possible to get tile sizes for geometry video of 256 (h)×128 (w) corresponding to tile 0, 128 (h)×256 (w) corresponding to tile 1, and 128 (h)×128 (w) corresponding to tile 2 under the constraints on tile structure imposed by HEVC.

In the second example, the encoder 510 sets the syntax element to a second value, which is illustrated in FIG. 8. In certain embodiments, the encoder 510 sets the value of the syntax element to a second value when the following conditions are satisfied. The first condition specifies that for each tile in the atlas frame (such as tile 0, tile 1, and tile 2), there is a set of video tiles for each video frame present (occupancy, geometry, and attributes) such that the set of video tiles, when scaled to the nominal format, together, represent exactly the same area on the atlas as the atlas tile. In this example, it is possible that there are a set of video tiles that correspond to each tile in the atlas frames, such that the set of video tiles, when scaled to the atlas resolution, together, represent exactly the same area on the atlas as the atlas tile. That is, this condition specifies that for each tile in the atlas frame there is a corresponding set of tiles in the video frame.

As illustrated in FIG. 8, the atlas frame is 1024×1024 with 16 tile partitions that are 256×256. The geometry frame is subsampled in both the X and Y directions by a factor of 2, such that the geometry frame is 512×512 with 11 tiles. The encoder 510 can determine where to make the partitions for coding efficiency. Video tile partitions 0, 1, 2, 3, 8, 9, 10, and 11 are 128 (w)×128 (h), while the video tile partitions 4, 5, 6, and 7 are 128 (w)×256 (h).

As illustrated, video tile 5 corresponds to atlas tile 0. If the video tile 5 is scaled to the nominal format, (that of 256 (w)×512 (h)), then the video tile 0 is the same size and occupies a similar area as the atlas tile 0 occupies on the atlas frame.

Similarly, the set of video tiles 8 and 9 corresponds to atlas tile 1. If the video tiles 8 and 9 (a set) are scaled to the nominal format, (that of 512 (w)×256 (h)), then the set of the video tile partitions 8 and 9 is the same size and occupies a similar area as the atlas tile 1 occupies on the atlas frame.

Likewise, video tile 11 corresponds to atlas tile 2. If the video tile 11 is scaled to the nominal format, (that of 256 (w)×256 (h)), then the video tile 2 is the same size and occupies a similar area on the video frame scaled to the nominal format as the atlas tile 2 occupies on the atlas frame.

The second condition specifies that when the syntax element is set to the second value, the tile structure for attribute, geometry, and occupancy map videos frames remains constant temporally throughout the duration of the point cloud sequence. The third condition specifies that the set of video tiles that correspond to an atlas tile from a single or multiple motion-constrained tile sets.

Furthermore, the encoder tries to utilize the minimum number of video tiles, while satisfying the above conditions. This is desirable for achieving good compression efficiency. In certain embodiments, the tiles may not always align as described in the above example. For example, if video tiles 4, 5, 6, and 7 of the video frame as illustrated in FIG. 8 were not modified to include the minimum possible tiles (such as illustrated in the video frame of FIG. 7), then the encoder 510 may be unable to set the syntax element to the second value.

In the third example, the encoder 510 sets the syntax element to a third value, which is illustrated in FIG. 9. In certain embodiments, the encoder 510 sets the value of the syntax element to a third value when the following conditions are satisfied. The first condition specifies that for each tile in the atlas frame, there is a corresponding video tile for each video frames present (occupancy, geometry, and attributes) such that the video tile, when scaled to the nominal represents an area on the atlas that is greater than or equal to the area represented by the atlas tile. For example, for each atlas tile, there is a corresponding video tile such that the video tile, when scaled to the atlas resolution, represents an area on the atlas that is greater than or equal to the area represented by the atlas tile. The second condition specifies the number of luma samples in the video tile is less than or equal to the number of samples in the atlas tile. The third condition specifies that the tile structure for attribute, geometry, and occupancy map videos remains constant temporally throughout the duration of the point cloud sequence. For example, this condition indicates that video tiles is a motion-constrained tile set. The fourth condition specifies that each video tile that corresponds to an atlas tile forms a motion-constrained tile set. That is, it is possible to decode the video tile without any information from tiles that are outside of the set. If the video is not in luma-chroma format (e.g. YUV or YCbCr), then the second condition can be modified to use the 0th component of the video instead of luma samples.

As shown in FIG. 9, the geometry video tile 2 corresponds to atlas tile 0. The geometry video tile 4 corresponds to atlas tile 1. The geometry video tile 5 corresponds to atlas tile 2.

For example, the atlas tile 0 is 256 (w)×512(h), the geometry video tile 2 is 256 (w)×256 (h), and when scaled to the nominal size, geometry video tile 2 is 512 (w)×512 (h). Therefore, the geometry video tile 2, satisfies the first condition since when it is scaled to the nominal size the geometry video tile 2 is larger than atlas tile 0. Additionally, the geometry video tile 2, satisfies the second condition since the number of luma samples in geometry video tile 2 is 256 (w)×256 (h), which is less than the size of the corresponding atlas tile 0, which is 256 (w)×512 (h).

For another example, the atlas tile 1 is 512 (w)×256 (h), the geometry video tile 4 is 256 (w)×128 (h), and when scaled to the nominal size, geometry video tile 4 is 512 (w)×256 (h). Therefore, the geometry video tile 4, satisfies the first condition since when it is scaled to the nominal size the geometry video tile 4 is equal to the atlas tile 1. Additionally, the geometry video tile 4, satisfies the second condition since the number of luma samples in geometry video tile 4 is 256 (w)×128 (h), which is less than the size of the corresponding atlas tile 1, which is 512 (w)×256 (h).

For yet another example, the atlas tile 2 is 256 (w)×256 (h), the geometry video tile 5 is 256 (w)×128 (h), and when scaled to the nominal size, geometry video tile 5 is 512 (w)×256 (h). Therefore, the geometry video tile 5, satisfies the first condition since when it is scaled to the nominal size, the geometry video tile 5 is larger than the atlas tile 2. Additionally, the geometry video tile 5, satisfies the second condition since the number of luma samples in geometry video tile 5 is 256 (w)×128 (h), which is less than the size of the corresponding atlas tile 2, which is 256 (w)×256 (h).

This scenario is useful when the subsampling factor for the video frames is high. For example, consider occupancy map for which the subsampling factor is chosen to be 4 in horizontal as well as vertical direction for atlas size of 1024×1024 and HEVC is used to code the occupancy map video. In this case, tiling similar to the one shown in FIG. 7 would result in some occupancy map video tiles of size 64×64, which are small and may result in loss of coding efficiency.

In a fourth example, the encoder 510 enforces the tile size consistency only for the video frames (attribute, geometry, and occupancy map). In this example, first the video frame with the highest resolution (width×height) is identified. Tiles are broken in an arbitrary manner. Consider a tile in the video frame having the highest resolution. Let the width and height of the highest resolution video frame be denoted by hiresFrameWidth and hiresFrameHeight, respectively. Let the width and height of the tile in the highest resolution video be denoted by hiresTileWidth and hiresTileHeight, respectively. Then, for each tile in the high resolution video frame, there is a corresponding tile in each of the remaining video frames such that the video tile represents exactly the same area on the atlas as that represented by the highest resolution video tile. The video tile sizes satisfy the following conditions.

In the first condition, Equations (3) and (4) are satisfied for each of the remaining video frames. The video tile width and height be denoted by videoTileWidth and videoTileHeight, respectively. The width and height of the video be denoted by videoWidth and videoHeight, respectively.

$$videoTileWidth = hiresTileWidth \times \frac{videoWidth}{hiresFrameWidth} \text{ and} \qquad (3)$$

$$videoTileHeight = hiresTileHeight \times \frac{videoHeight}{hiresFrameHeight}. \qquad (4)$$

In the second condition, the tiling for attribute, geometry, and occupancy map videos remains temporally constant throughout the duration of the point cloud sequence. In the third condition, it is possible to decode a video tile without reference to any information from other tiles belonging to the same sub-bitstream (frame).

The following syntax can be used to indicate the tiling structure between video frames and atlas frames.

```
Syntax                                                  (1)
vui_tile_restrictions_present_flag
if( vui_tile_restrictions_present_flag ) {
    vui_fixed_atlas_tile_structure_flag
    vui_fixed_video_tile_structure_flag
    vui_constrained_tiles_across_v3c_components_idc
    vui_max_num_tiles_per_atlas_minus1
}
```

As describe in Syntax (1) when the expression vui_tile_restrictions_present_flag is equal to 1 specifies that the syntax elements vui_fixed_atlas_tile_structure_flag, vui_fixed_video_tile_structure_flag, vui_constrained_tiles_acros s_v3c_components_idc, and vui_max_num_tiles_per_atlas_minus1 are present in the vui_parameters( ) syntax structure. Alternatively, when the expression vui_tile_restrictions_present_flag equal to 0 specifies that the syntax elements vui_fixed_atlas_tile_structure_flag, vui_fixed_video_tile_structure_flag, vui_constrained_tiles_across_v3c_components_idc, and vui_max_num_tiles_per_atlas_minus1 are not present in the vui_parameters( ) syntax structure.

When the expression vui_fixed_atlas_tile_structure_flag is equal to 1 indicates that all the atlas frames of the current atlas shall have the same tiling structure. When the expression vui_fixed_atlas_tile_structure_flag is equal to 0 indicates that atlas frames of the current atlas may or may not have the same tiling structure. When the vui_fixed_atlas_tile_structure_flag syntax element is not present, it is inferred to be equal to 0.

When the expression vui_fixed_video_tile_structure_flag is equal to 1, indicates that for each video sub-bitstream associated with the current atlas, all of its frames shall have the same tiling structure. When the expression vui_fixed_video_tile_structure_flag is equal to 0 indicates that for each video sub-bitstream associated with the current atlas, frames may or may not have the same tiling structure. When the vui_fixed_video_tile_structure_flag syntax element is not present, it is inferred to be equal to 0.

The expression vui_constrained_tiles_across_v3c_components_idc indicates whether any constraints apply to the sizes of tiles in the atlas sub-bitstream and the video tiles in the video sub-bitstreams, as specified in Table 1, below:

TABLE 1

| Value | Interpretation |
|---|---|
| 0 | Unconstrained |
| 1 | Proportionally constrained video tiles |

TABLE 1-continued

| Value | Interpretation |
|---|---|
| 2 | Atlas based constrained video tiles with exact match |
| 3 | Atlas based constrained video tiles |
| 4 | Edge based constrained video tiles |

In certain embodiments, video tiles can be independent coding units defined by the video or image coding specification and may vary in name (such as slices, partitions, tiles, or sub-pictures, and the like). When the expression, vui_constrained_tiles_across_v3c_components_idc is equal to 0, indicates that the tile sizes of the video are constrained only by the video coding specification used. The tile sizes of the atlas sub-bitstream are constrained by this document.

When the expression vui_constrained_tiles_across_v3c_components_idc equals 1 indicates that the tile sizes of the video and atlas sub-bitstreams are constrained based on the following. For each tile in the atlas sub-bitstream, there is a corresponding video tile for each video sub-bitstream present (attributes, geometry, and occupancy) such that the video tile, when scaled to the nominal format represents exactly the same area on the atlas as the corresponding atlas tile. It is noted that the nominal format has the same resolution as the atlas. It is possible to decode each video tile that corresponds to a tile in the atlas sub-bitstream without reference to any information from other video tiles in that sub-bitstream.

When the expression vui_constrained_tiles_across_v3c_components_idc equals 2, indicates that the tile sizes of the video and atlas sub-bitstreams are constrained based on the following. For each tile in the atlas sub-bitstream, there is a set of video tiles for each video sub-bitstream present (occupancy, geometry, and attributes) such that the set of video tiles, when scaled to the nominal format, together, represent exactly the same area on the atlas as the atlas tile. It is possible to decode each set of video tiles that corresponds to a tile in the atlas sub-bitstream without reference to any information from video tiles from that sub-bitstream that are outside that set.

When the expression, vui_constrained_tiles_across_v3c_components_idc equals 3 indicates that the tile sizes of the video and atlas sub-bitstreams are constrained based on the following. For each tile in the atlas sub-bitstream, there is a corresponding video tile for each video sub-bitstream present (occupancy, geometry, and attributes) such that the video tile, when scaled to the nominal format, represents an area on the atlas that is greater than or equal to the area represented by the atlas tile. Additionally, the number of luma samples in the video tile shall be less than or equal to the number of samples in the atlas tile. It is possible to decode each video tile that corresponds to a tile in the atlas sub-bitstream without reference to any information from other video tiles in that sub-bitstream.

Although FIGS. 6, 7, 8, and 9 illustrate example tiling structures various changes can be made to FIGS. 6, 7, 8, and 9. For example, the frames can be different sizes. For another example, any number of tile partitions can be used. For yet another example, the number of tiles and their locations can be different.

Figure 10:
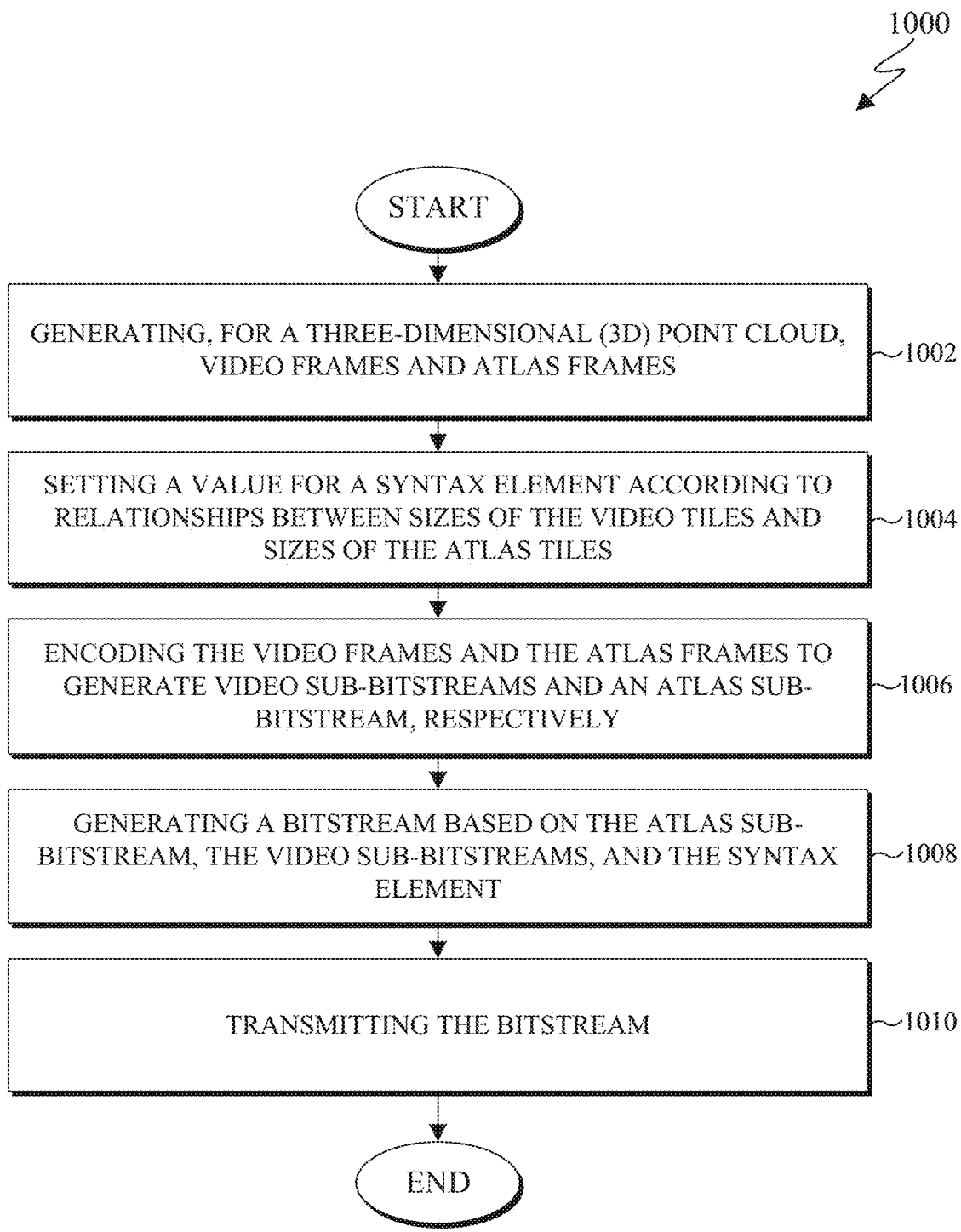
FIG. 10 illustrates example method for encoding a point cloud in accordance with an embodiment of this disclosure.

FIG. 10 illustrates example method 1000 for encoding a point cloud in accordance with an embodiment of this disclosure. The method 1000 can be performed by the server 104 or any of the client devices 106-116 of FIG. 1, the server 200 of FIG. 2, the electronic device 300 of FIG. 3, the encoder 510 of FIGS. 5A and 5B, or any other suitable device or system. For ease of explanation, the method 1000 is described as being performed by the encoder 510 of FIGS. 5A and 5B.

In step 1002, the encoder 510 generates for a 3D point cloud, video frames and atlas frames that includes pixels representing information about the 3D point cloud. The video frames can include geometry frames, zero or more attribute frames, and an occupancy map frames.

A portion of the pixels included in the geometry frame represent geometric locations of points of the 3D point cloud that are organized into patches corresponding to respective clusters of the points of the 3D point cloud. The attribute frame includes pixels and a portion of the pixels of the attribute frame represent attribute information of points of the 3D point cloud, such as color. The occupancy map frame includes pixels that identify the portion of the pixels in the geometry frame that represent the geometric locations of the points of the 3D point cloud. The pixels of the occupancy map frame also identify the positions of the pixels in the attribute frame that represent the attribute information of the points of the 3D point cloud. The atlas frames include information that relate the pixels in the video frames to points of the 3D point cloud.

The video frames and the atlas frames can include tiles. In certain embodiments, the encoder 510 determines the locations for vertical lines and horizontal lines that form each tile in the video frames and the atlas frames. When determining the locations of the vertical and horizontal lines, the encoder 510 can determine to use a minimum number of tiles for compression efficiency. For example, the more tiles that are included in a frame can decrease the compression efficiency. However, as the number of tiles increase a decoder (such as the decoder 550) can select certain tiles to decode when rendering the point cloud, which reduces processing power. As such, the encoder 510 weights both scenarios and identifies a minimum number of tiles that are to be maintained in the frames. In certain embodiments, a video tiling structure for the tiles of the video frames and an atlas tiling structure for the tiles of the atlas frames are maintained throughout all of the frames. In certain embodiments, the sizes of each of the tiles in a video frame, when scaled to that of the atlas frame, are proportional in size to the tiles in the atlas frame.

In certain embodiments, the video frame sizes may be different from one another. As such, the tiles within any of the video frames may be different from one another. Similarly, the atlas frame sizes may be different than the video frame sizes. As such, the tiles within any of the video frames may be different from the tile sizes in the atlas frames.

For example, the geometry video frames may be a first size while the attribute video frames, the occupancy map video frames, and the atlas In step 1004, the encoder 510 sets a value for a syntax element based on relationships between sizes of the tiles in the video frames and sizes of the tiles in the atlas frame. Based on the relationship between tile sizes, a decoder (such as the decoder 550) can determine portions of the frames to decode for partial decoding.

In certain embodiments, the encoder 510 sets the value of the syntax element to a first value (such as one) when the following conditions are satisfied. First, for each tile in the atlas frame, there is a corresponding video tile in each of the video frames (such as the geometry frames, the attribute frames, the occupancy map frames), such that the video tile, when scaled to the nominal format, the scaled video tile represents the same area on the atlas frame as the corresponding atlas tile. Second, the encoder 510 determines to constrain motion during the encoding. For example, a decoder can decode each video tile that corresponds to a tile in the atlas frame without reference to any information from other video tiles in a particular set of frames (such as the geometry frames).

For example, the encoder 510 set the value of the syntax element to the first value after determining that for each of the tiles in a first video frame of the video frames there is a corresponding atlas tile in a first atlas frame of the atlas frames. Thereafter, the encoder 510 determines that when the first video frame is scaled to a nominal format, each scaled video tile, of the video tiles included in the scaled first video frame, represents a similar area on the first atlas frame as the corresponding atlas tile. It is noted that if the nominal size in X or Y direction is a multiple of the subsampling factor, then the scaled video tile should represent the same area. In certain embodiments, the video tiles when scaled may be slightly bigger than the atlas tiles. Thereafter, the encoder 510 determines that when the video frames are encoded, motion is constrained within each one of the video tiles. After these determinations, the encoder 510 sets the value of the syntax element to the first value.

In certain embodiments, the encoder 510 sets the value of the syntax element to a second value (such as two) when the following conditions are satisfied. First, for each tile in the atlas frame, there are a set of corresponding tiles in each of the video frames (such as the geometry frames, the attribute frames, the occupancy map frames), such that the set of video tiles, when scaled to the nominal format, the scaled set of video tiles represent the same area on the atlas frame as the corresponding atlas tile. Second, the encoder 510 determines to constrain motion during the encoding. For example, a decoder can decode each set of video tiles that corresponds to a tile in the atlas frame without reference to any information from other video tiles in a particular set of frames (such as the geometry frames).

For example, the encoder 510 set the value of the syntax element to a second value after determining that for each set of tiles in a first video frame of the video frames there is a corresponding atlas tile in a first atlas frame of the atlas frames. Thereafter, the encoder 510 determines that when the first video frame is scaled to a nominal format, each scaled set of video tiles, of the video tiles included in the scaled first video frame, represents a similar area on the first atlas frame as the corresponding atlas tile. Thereafter, the encoder 510 determines that when the video frames are encoded, motion is constrained within each one of the set of video tiles. After these determinations, the encoder 510 sets the value of the syntax element to the second value.

In certain embodiments, the encoder 510 sets the value of the syntax element to a third value (such as three) when the following conditions are satisfied. First, for each tile in the atlas frame, there is a corresponding video tile in each of the video frames (such as the geometry frames, the attribute frames, the occupancy map frames), such that the video tile, when scaled to the nominal format, the scaled video tile represents an area on the atlas frame that is greater than or equal to the area represented by the corresponding atlas tile. Second, the actual number of luma samples in the video tile (when not scaled) is less than or equal to the number of samples in the atlas tile. It is noted that if the video format is not is YCbCr format (such as in an RGB format) then the luma samples correspond to the samples in the 0th component. Third, the encoder 510 determines to constrain motion during the encoding. For example, a decoder can decode each video tile that corresponds to a tile in the atlas frame without reference to any information from other video tiles in a particular set of frames (such as the geometry frames).

In certain embodiments, the value of the syntax element allows the decoder 550 to calculate the upper-bound on the number samples that the decoder 550 needs to decode for each video sub-bitstream. For example, when the syntax element is the first value or the second value, for each atlas tile, the number of video tile samples calculated at the nominal format is exactly the same as the atlas tile. However, when the syntax element is the third value, indicates is the upper-bounded by the number of samples in that atlas tile.

In step 1006, the encoder 510 encodes the video frames to generate video sub-bit-streams. The encoder 510 also encodes the atlas frames to generate an atlas sub-bit-stream. After the frames representing 3D point cloud are encoded, the encoder 510 can multiplex the video sub-bit-streams and the atlas sub-bit-stream and the syntax element to generate a bitstream (step 1008). In step 1010, the encoder 510 transmits the bitstream. The bitstream can be ultimately transmitted to a decoder, such as the decoder 550.

Although FIG. 10 illustrates one example of a method 1000 for encoding a point cloud, various changes may be made to FIG. 10. For example, while shown as a series of steps, various steps in FIG. 10 could overlap, occur in parallel, or occur any number of times.

Figure 11:
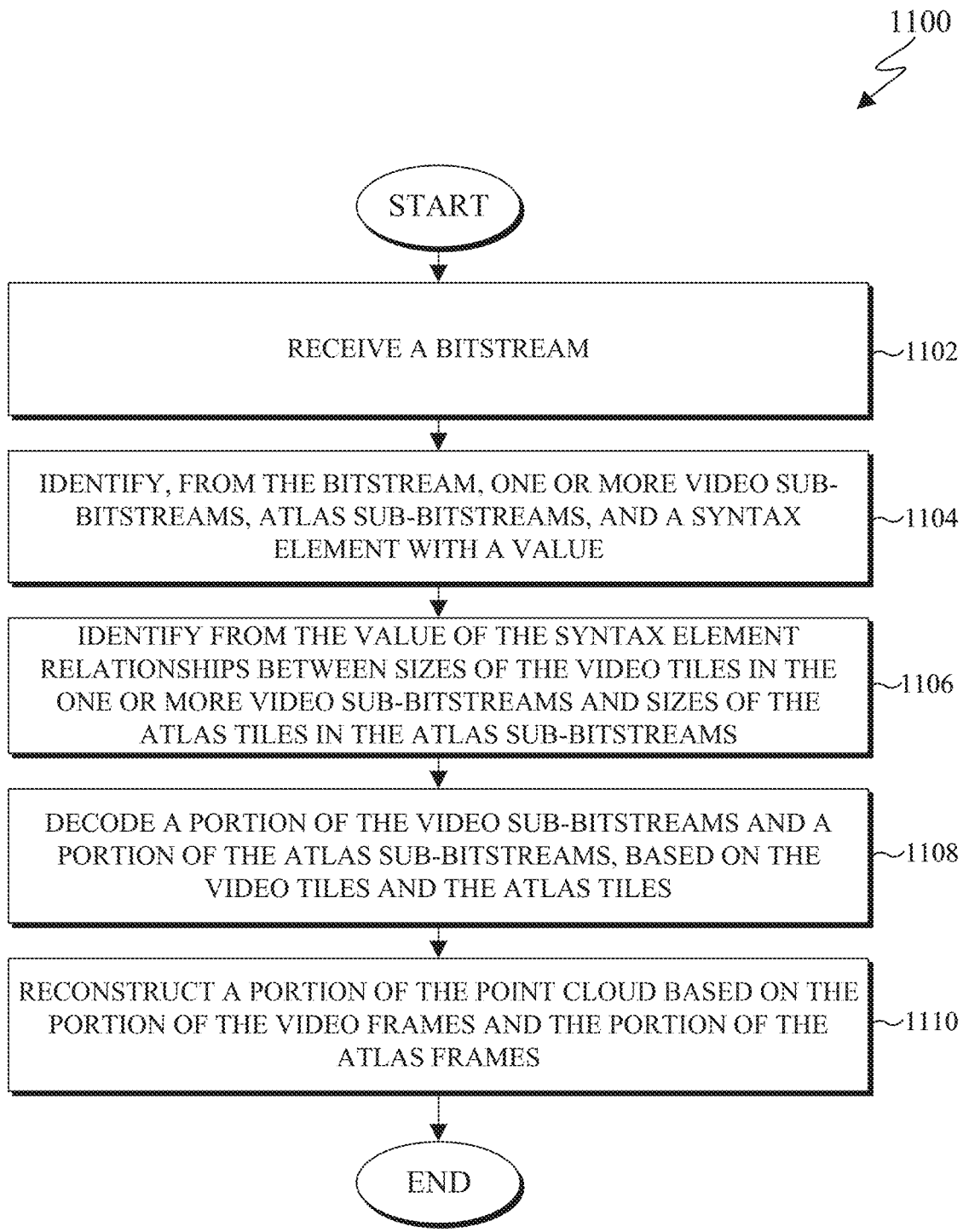
FIG. 11 illustrates example method for decoding a point cloud in accordance with an embodiment of this disclosure.

FIG. 11 illustrates example method 1100 for decoding a point cloud in accordance with an embodiment of this disclosure. The method 1100 can be performed by the server 104 or any of the client devices 106-116 of FIG. 1, the server 200 of FIG. 2, the electronic device 300 of FIG. 3, the decoder 550 of FIGS. 5A and 5C, or any other suitable device or system. For ease of explanation, the method 1100 is described as being performed by the decoder 550 of FIGS. 5A and 5C.

The method 1100 begins with the decoder, such as decoder 550, receiving a compressed bitstream (step 1102). In step 1104, the decoder 550 identifies from the received bitstream one or more video sub-bitstreams representing a 3D point cloud, atlas sub-bitstreams, and a syntax element with a value. The video sub-bitstreams can include video sub-bitstreams corresponding to geometry information, zero or more attribute information, and occupancy map information. Tiles can be included in the atlas sub-bitstreams and the video sub-bitstreams.

In step 1104, the decoder identifies from the value of the syntax element relationships between the sizes of the tiles in the included in the atlas sub-bitstreams and the tiles included in the video sub-bitstreams. The decoder can determine, based on the value of the syntax element, whether a video tiling structure for the video tiles and an atlas tiling structure for the atlas tiles is maintain throughout the bitstream to enable partial decoding. In certain embodiments, for a given area of a first atlas frame of the atlas frames, the decoder 550 estimates an area of a first video frame, of the video frames, to decode based on the value of the syntax element.

In step 1106, the decoder 550 identifies the value of the syntax element. In certain embodiments, the decoder 550 identifies, based on the value of the syntax element, relationships between sizes of the video tiles and sizes of the atlas tiles.

When the value of the syntax element is a first value (such as one), the decoder 550 can determine that a number of pixels that are decoded in a first video frame is estimated based on the given area of the first atlas frame that is scaled to the first video frame. For example, the when the value of the syntax element is a first value, provides an indication to the decoder 550 that the following conditions are satisfied. First, for each tile in the atlas frame, there is a corresponding video tile in each of the video frames (such as the geometry frames, the attribute frames, the occupancy map frames), such that the video tile, when scaled to the nominal format, the scaled video tile represents the same area on the atlas frame as the corresponding atlas tile. Second, the decoder 550 understands that motion was constrained within a tile during the encoding process. For example, a decoder 550 can decode each video tile that corresponds to a tile in the atlas frame without reference to any information from other video tiles in a particular set of frames (such as the geometry frames).

For example, when the value of the syntax element is a first value, the decoder 550 can determine that for each of the tiles in a first video frame of the video frames there is a corresponding atlas tile in a first atlas frame of the atlas frames. The decoder 550 can also determine that when the first video frame is scaled to a nominal format, each scaled video tile, of the video tiles included in the scaled first video frame, represents a similar area on the first atlas frame as the corresponding atlas tile. The decoder 550 can further determine that when the video frames were encoded, motion was constrained within each one of the video tiles. Based on these determinations, a number of pixels that are decoded in the first video frame is estimated based on the given area of the first atlas frame that is scaled to the first video frame.

When the value of the syntax element is a second value (such as two), the decoder 550 can determine that a number of pixels that are decoded in a first video frame is estimated based on the given area of the first atlas frame that is scaled to the first video frame. For example, the when the value of the syntax element is a first value, provides an indication to the decoder 550 that the following conditions are satisfied. First, for each tile in the atlas frame, there are a set of corresponding tiles in each of the video frames (such as the geometry frames, the attribute frames, the occupancy map frames), such that the set of video tiles, when scaled to the nominal format, the scaled set of video tiles represent the same area on the atlas frame as the corresponding atlas tile Second, the decoder 550 understands that motion was constrained within the set of tiles during the encoding process. For example, a decoder 550 can decode each video tile that corresponds to a tile in the atlas frame without reference to any information from other video tiles in a particular set of frames (such as the geometry frames).

For example, when the value of the syntax element is a second value, the decoder 550 can determine that for each set of video tiles in the first video frame there is a corresponding atlas tile in the first atlas frame. The decoder 550 can also determine that when the first video frame is scaled to a nominal format, each scaled set of video tiles, of the video tiles included in the scaled first video frame, represents a similar area on the first atlas frame as the corresponding atlas tile. The decoder 550 can further determine that motion is constrained within each one of the set of video tiles. Based on these determinations, a number of pixels that are decoded in the first video frame is estimated based on the given area of the first atlas frame that is scaled to the first video frame.

When the value of the syntax element is a third value (such as three), the decoder 550 can determine that a number of pixels that are decoded in a first video frame is estimated based on the given area of the first atlas frame. For example, the when the value of the syntax element is a third value, provides an indication to the decoder 550 that the following conditions are satisfied. First, for each tile in the atlas frame, there is a corresponding video tile in each of the video frames (such as the geometry frames, the attribute frames, the occupancy map frames), such that the video tile, when scaled to the nominal format, the scaled video tile represents an area on the atlas frame that is greater than or equal to the area represented by the corresponding atlas tile. Second, the actual number of luma samples in the video tile (when not scaled) is less than or equal to the number of samples in the atlas tile. Third, the decoder 550 understands that motion was constrained within a tile during the encoding process. For example, a decoder 550 can decode each video tile that corresponds to a tile in the atlas frame without reference to any information from other video tiles in a particular set of frames (such as the geometry frames).

For example, when the value of the syntax element is a third value, the decoder 550 can determine that for each of the video tiles in the first video frame there is a corresponding atlas tile in the first atlas frame. The decoder 550 can also determine that when the first video frame is scaled to a nominal format, each scaled video tile, of the video tiles included in the scaled first video frame, represents an area on the first atlas frame is greater than or equal to the corresponding atlas tile. The decoder 550 can further determine that a number of luma samples in a video tile of the first video frame is less than or equal to a number of luma samples in the corresponding atlas tile. Additionally, the decoder 550 can determine that motion is constrained within each one of the video tiles. Based on these determinations, a number of pixels that are decoded in the first video frame is estimated based on the given area of the first atlas frame.

In certain embodiments, the value of the syntax element allows the decoder 550 to calculate the upper-bound on the number samples that the decoder 550 needs to decode for each video sub-bitstream when performing partial decoding of video. For example, when the syntax element is the first value or the second value, for each atlas tile, the number of video tile samples calculated at the nominal format is exactly the same as the atlas tile. However, when the syntax element is the third value, indicates is the upper-bounded by the number of samples in that atlas tile.

In step 1108, the decoder 550 decodes portion of the video sub-bitstreams and a portion of the atlas sub-bitstreams, based on the video tiles and the atlas tiles, to generate a portion of video frames and a portion of atlas frames. In certain embodiments, the portion of the video sub-bitstreams and the atlas sub-bitstreams that are decoded includes the entirety of all of the sub-bitstreams. In other embodiments, portion of the video sub-bitstreams and the atlas sub-bitstreams that are decoded includes certain tiles that are decoded. In yet other embodiments, portion of the video sub-bitstreams and the atlas sub-bitstreams that are decoded includes some tiles from certain sub-bitstreams and the entirety of other bitstreams.

For example, the decoder 550 decodes a portion of the atlas sub-bitstream that corresponds to an area of interest to generate a portion of an atlas frame. The decode 550, for the decoded portion of the first atlas frame, estimates an area of a first video frame representing an occupancy map frame to decode from the video sub-bitstreams. The decoder 550 then uses the decoded portion of the occupancy map frame to decode corresponding portions video frames representing geometry frames and attribute frames (if present) from the video sub-bitstreams.

In step 1110, the decoder 550 reconstructs a portion of the 3D point cloud using the decoded portion video frames and the decoded portion of the atlas frames.

Although FIG. 11 illustrates one example of a method 1100 for decoding a point cloud, various changes may be made to FIG. 11. For example, while shown as a series of steps, various steps in FIG. 11 could overlap, occur in parallel, or occur any number of times.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A decoding device for point cloud decoding, the decoding device comprising:
   a communication interface configured to receive a bitstream; and
   a processor operably coupled to the communication interface, the processor configured to:
      identify, from the bitstream, one or more video sub-bitstreams representing a three-dimensional (3D) point cloud and an atlas sub-bitstream, wherein atlas tiles are included in the atlas sub-bitstream and video tiles are included in the one or more video sub-bitstreams;
      identify a syntax element that indicates whether a constraint applies to sizes of the video tiles in the one or more video sub-bitstreams and to sizes of the atlas tiles in the atlas sub-bitstream;
      decode, based on a value of the syntax element, at least a portion of the video sub-bitstreams and at least a portion of the atlas sub-bitstream to respectively generate at least a portion of video frames and at least a portion of atlas frames; and
      reconstruct at least a portion of the 3D point cloud based on at least the portion of the video frames and at least the portion of the atlas frames.

2. The decoding device of claim 1, wherein when the value of the syntax element is a first value:
   the processor is configured to identify that the sizes of the atlas tiles and the sizes of the video tiles are constrained as follows:
      for each atlas tile in the atlas sub-bitstream there is a corresponding video tile in each of the one or more video sub-bitstreams, and
      the corresponding video tile in each of the one or more video sub-bitstreams, when scaled to a nominal format, represents an area that is equal to an area represented by the corresponding atlas tile, and
   the processor is configured to decode each video tile in each of the one or more video sub-bitstreams without reference to information from other video tiles in the one or more video sub-bitstreams.

3. The decoding device of claim 2, wherein the first value is equal to 1.

4. The decoding device of claim 1, wherein when the value of the syntax element is a second value:

the processor is configured to identify that the sizes of the atlas tiles and the sizes of the video tiles are constrained as follows:
for each atlas tile in the atlas sub-bitstream there is a corresponding set of video tiles in each of the one or more video sub-bitstreams, and
the corresponding set of video tiles in each of the one or more video sub-bitstreams, when scaled to a nominal format, represents an area that is equal to an area represented by the corresponding atlas tile, and
the processor is configured to decode each set of video tiles in each of the one or more video sub-bitstreams without reference to information from other video tiles in the one or more video sub-bitstreams.

5. The decoding device of claim 4, wherein the second value is equal to 2.

6. The decoding device of claim 1, wherein when the value of the syntax element is a third value:
the processor is configured to identify that the sizes of the atlas tiles and the sizes of the video tiles are constrained as follows:
for each atlas tile in the atlas sub-bitstream there is a corresponding video tile in each of the one or more video sub-bitstreams, and
the corresponding video tile in each of the one or more video sub-bitstreams, when scaled to a nominal format, represents an area that is greater than or equal to an area represented by the corresponding atlas tile, and
the processor is configured to decode each video tile in each of the one or more video sub-bitstreams without reference to information from other video tiles in the one or more video sub-bitstreams.

7. The decoding device of claim 6, wherein when the value of the syntax element is the third value, the processor is further configured to identify that a number of luma samples in the corresponding video tile is less than or equal to a number of samples in the atlas tile.

8. The decoding device of claim 6, wherein the third value is equal to 3.

9. The decoding device of claim 1, wherein for a given area of a first atlas frame of the atlas frames, the processor is further configured to estimate an area of a first video frame, of the video frames, to decode based on the value of the syntax element.

10. The decoding device of claim 1, wherein the video frames include a set of geometry frames, one or more sets of attribute frames, and a set of occupancy map frames.

11. A method performed by a decoding device, the method comprising:
receiving a bitstream;
identifying, from the bitstream, one or more video sub-bitstreams representing a three-dimensional (3D) point cloud and an atlas sub-bitstream, wherein atlas tiles are included in the atlas sub-bitstream and video tiles are included in the one or more video sub-bitstreams;
identifying a syntax element that indicates whether a constraint applies to sizes of the video tiles in the one or more video sub-bitstreams and to sizes of the atlas tiles in the atlas sub-bitstream;
decoding, based on a value of the syntax element, at least a portion of the video sub-bitstreams and at least a portion of the atlas sub-bitstream to respectively generate at least a portion of video frames and at least a portion of atlas frames; and
reconstructing at least a portion of the 3D point cloud based on at least the portion of the video frames and at least the portion of the atlas frames.

12. The method of claim 11, further comprising, when the value of the syntax element is a first value:
identifying that the sizes of the atlas tiles and the sizes of the video tiles are constrained as follows:
for each atlas tile in the atlas sub-bitstream there is a corresponding video tile in each of the one or more video sub-bitstreams, and
the corresponding video tile in each of the one or more video sub-bitstreams, when scaled to a nominal format, represents an area that is equal to an area represented by the corresponding atlas tile; and
decoding each video tile in each of the one or more video sub-bitstreams without reference to information from other video tiles in the one or more video sub-bitstreams.

13. The method of claim 12, wherein the first value is equal to 1.

14. The method of claim 11, further comprising, when the value of the syntax element is a second value:
identifying that the sizes of the atlas tiles and the sizes of the video tiles are constrained as follows:
for each atlas tile in the atlas sub-bitstream there is a corresponding set of video tiles in each of the one or more video sub-bitstreams, and
the corresponding set of video tiles in each of the one or more video sub-bitstreams, when scaled to a nominal format, represents an area that is equal to an area represented by the corresponding atlas tile; and
decoding each set of video tiles in each of the one or more video sub-bitstreams without reference to information from other video tiles in the one or more video sub-bitstreams.

15. The method of claim 14, wherein the second value is equal to 2.

16. The method of claim 11, further comprising, when the value of the syntax element is a third value:
identifying that the sizes of the atlas tiles and the sizes of the video tiles are constrained as follows:
for each atlas tile in the atlas sub-bitstream there is a corresponding video tile in each of the one or more video sub-bitstreams, and
the corresponding video tile in each of the one or more video sub-bitstreams, when scaled to a nominal format, represents an area that is greater than or equal to an area represented by the corresponding atlas tile; and
decoding each video tile in each of the one or more video sub-bitstreams without reference to information from other video tiles in the one or more video sub-bitstreams.

17. The method of claim 16, further comprising, when the value of the syntax element is the third value, identifying that a number of luma samples in the corresponding video tile is less than or equal to a number of samples in the atlas tile.

18. The method of claim 16, wherein the third value is equal to 3.

19. The method of claim 11, further comprising, for a given area of a first atlas frame of the atlas frames, estimating an area of a first video frame, of the video frames, to decode based on the value of the syntax element.

20. The method of claim 11, wherein the video frames include a set of geometry frames, one or more sets of attribute frames, and a set of occupancy map frames.

* * * * *